US012802289B2

(12) United States Patent
Vlassis et al.

(10) Patent No.: US 12,802,289 B2
(45) Date of Patent: Nov. 17, 2026

(54) IMAGE GENERATION BASED ON A GENERATED PROMPT

(71) Applicant: ADOBE INC., San Jose, CA (US)

(72) Inventors: Nikolaos Vlassis, San Jose, CA (US); Anand Khanna, San Jose, CA (US); Ion Rosca, Morgan Hill, CA (US); Chris Campbell, Brentwood, CA (US); Oliver Brdiczka, San Jose, CA (US)

(73) Assignee: ADOBE INC., San Jose, CA (US)

( * ) Notice: Subject to any disclaimer, the term of this patent is extended or adjusted under 35 U.S.C. 154(b) by 120 days.

(21) Appl. No.: 18/769,506

(22) Filed: Jul. 11, 2024

(65) Prior Publication Data

US 2026/0017839 A1 Jan. 15, 2026

(51) Int. Cl.

| | |
|---|---|
| ***G09G 5/00*** | (2006.01) |
| ***G06F 40/284*** | (2020.01) |
| ***G06F 40/40*** | (2020.01) |
| ***G06T 11/00*** | (2006.01) |

(52) U.S. Cl.

CPC ............ *G06T 11/00* (2013.01); *G06F 40/284* (2020.01); *G06F 40/40* (2020.01); *G06T 2200/24* (2013.01)

(58) Field of Classification Search

CPC ......... G06T 11/60; G06T 11/40; G06T 19/00; G06T 11/00; G06T 11/20; G06T 11/206; G06T 7/0012; G06T 2207/10081; G06T 2207/30004; G06T 11/203; G06T 2211/441; G06T 2210/28; G06T 11/001; G06T 2200/12; G06T 2200/24; G06F 9/4443; G06F 3/0481; G06F 30/13; G06F 3/04845; G06F 3/04883; G06F 40/143; G06F 16/54; G06F 16/56; G06F 16/5838; G06F 16/58; G06F 16/55; G06F 40/40; G06V 20/20; G06V 10/7753; G11B 27/10; H04N 21/47217; G16H 30/20; G06N 20/20; G06N 3/045; G06N 3/047; G06N 3/08; G06Q 3/0643

USPC .......................................................... 345/619

See application file for complete search history.

(56) References Cited

U.S. PATENT DOCUMENTS

| | | | | |
|---|---|---|---|---|
| 2021/0335029 | A1* | 10/2021 | Kowalski | G06T 11/60 |
| 2023/0325725 | A1* | 10/2023 | Lester | G06V 10/7747 |
| 2025/0094816 | A1* | 3/2025 | Hu | H04L 51/02 |
| 2025/0131261 | A1* | 4/2025 | Harang | G06N 20/00 |
| 2025/0349040 | A1* | 11/2025 | Aberman | G06V 10/82 |

* cited by examiner

*Primary Examiner* — Gordon G Liu

(74) *Attorney, Agent, or Firm* — F. CHAU & ASSOCIATES, LLC

(57) ABSTRACT

A method, apparatus, non-transitory computer readable medium, and system for data processing include obtaining a text generation prompt and a target token indicating an image generation prompt attribute, generating an image generation prompt based on the text generation prompt and the target token, where the image generation prompt has the image generation prompt attribute, and generating a synthetic image based on the image generation prompt.

20 Claims, 15 Drawing Sheets

IMAGE GENERATION BASED ON A GENERATED PROMPT

BACKGROUND

The following relates generally to machine learning, and more specifically to image generation using machine learning. Machine learning algorithms build a model based on sample data, known as training data, to make a prediction or a decision in response to an input without being explicitly programmed to do so. One area of application for machine learning is image generation.

For example, a machine learning model can be trained to predict information for an image in response to an input prompt, and to then generate the image based on the predicted information. In some cases, the prompt can be a text prompt that describes some aspect of the image, such as an item to be depicted, or a style of the depiction. Text-based image generation allows a user to produce an image without using an original image as an input, and therefore makes image generation easier for a layperson and also more readily automated.

SUMMARY

Embodiments of the present disclosure provide an image generation system. In some cases, the image generation system includes a language model and an image generation model. In some cases, the image generation system obtains a text generation prompt and a target token, where the target token indicates an image generation prompt attribute. In some cases, the image generation system generates, using the language model, an image generation prompt (e.g., a text prompt) based on the text generation prompt and the target token, such that the image generation prompt includes the image generation prompt attribute. In some cases, the image generation model generates, using the image generation model, a synthetic image based on the image generation prompt.

Accordingly, in some cases, by generating the image generation prompt based on the text generation prompt, and generating the synthetic image based on the image generation prompt, the image generation system allows a user to obtain the synthetic image without having to fully describe the synthetic image in the text generation prompt, thereby increasing user access to the image generation process.

In some cases, the target token is obtained based on a user input. Accordingly, in some cases, by generating the image generation prompt based on the target token, the image generation system allows the user to control a characteristic of the synthetic image in a more intuitive manner than by describing the characteristic using natural language.

Furthermore, in some cases, the image generation prompt attribute comprises a vocabulary attribute corresponding to words that are allowed to be included in the image generation prompt. Accordingly, by generating the synthetic image based on the image generation prompt having the vocabulary attribute, the image generation system is able to avoid harmful or undesirable content being depicted in the synthetic image.

A method, apparatus, non-transitory computer readable medium, and system for image generation are described. One or more aspects of the method, apparatus, non-transitory computer readable medium, and system include obtaining a text generation prompt and a target token indicating an image generation prompt attribute; generating, using a language model, an image generation prompt based on the text generation prompt and the target token, wherein the image generation prompt has the image generation prompt attribute; and generating, using an image generation model, a synthetic image based on the image generation prompt.

A method, apparatus, non-transitory computer readable medium, and system for training a machine learning model are described. One or more aspects of the method, apparatus, non-transitory computer readable medium, and system include obtaining training data comprising a training input text and a target token indicating an image generation prompt attribute and training, using the training data, a language model to generate an image generation prompt based on the training input text and the target token.

An apparatus and system for image generation are described. One or more aspects of the apparatus and system include at least one memory component; at least one processor executing instructions stored in the at least one memory component; a language model comprising text generation parameters stored in the at least one memory component, the language model trained to generate an image generation prompt based on a text generation prompt and a target token indicating an image generation prompt attribute, wherein the image generation prompt has the image generation prompt attribute; and an image generation model comprising image generation parameters stored in the at least one memory component, the image generation model trained to generate a synthetic image based on the image generation prompt.

DETAILED DESCRIPTION

Figure 1:
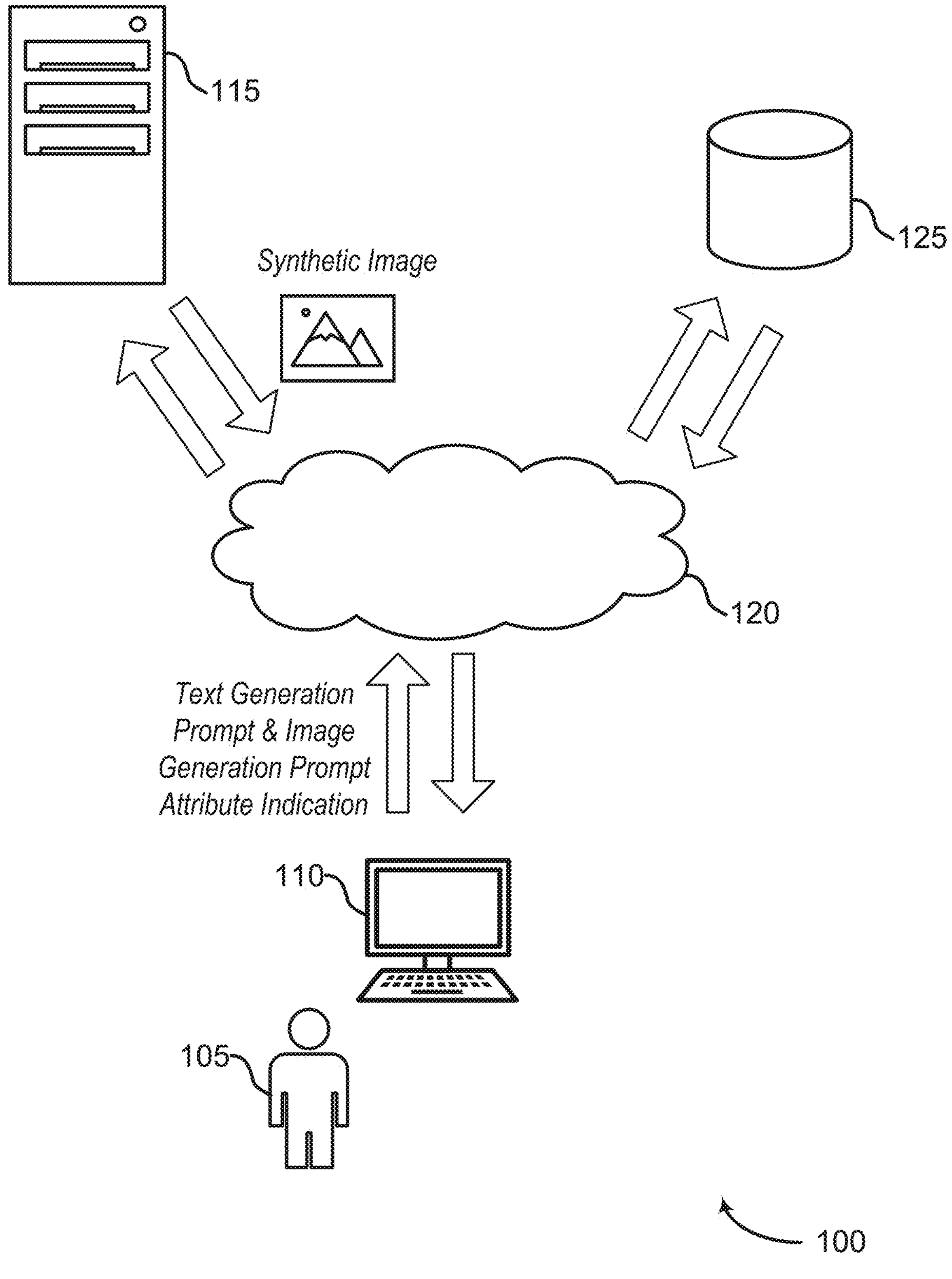
FIG. 1 shows an example of an image generation system according to aspects of the present disclosure.

Machine learning algorithms build a model based on sample data, known as training data, to make a prediction or a decision in response to an input without being explicitly programmed to do so. One area of application for machine learning is image generation.

For example, a machine learning model can be trained to predict information for an image in response to an input prompt, and to then generate the image based on the predicted information. In some cases, the prompt can be a text prompt that describes some aspect of the image, such as an item to be depicted, or a style of the depiction. Text-based image generation allows a user to produce an image without having to use an original image as an input, and therefore makes image generation easier for a layperson and also more readily automated.

However, some conventional approaches to text-based image generation rely on a user providing a text prompt that describes an image in detail in order to generate an image that accurately reflects the text prompt, and the user may be unwilling or unable to provide the detailed text prompt. Furthermore, a user may accidentally or intentionally provide a text prompt that includes undesirable words or combinations of words (such as profanity, proper nouns, and the like) and that may result in an image being generated that depicts inappropriate content.

Embodiments of the present disclosure provide an image generation system. In some cases, the image generation system includes a language model and an image generation model. In some cases, the image generation system obtains a text generation prompt and a target token, where the target token indicates an image generation prompt attribute. In some cases, the image generation system generates, using the language model, an image generation prompt (e.g., a text prompt) based on the text generation prompt and the target token, such that the image generation prompt includes the image generation prompt attribute. In some cases, the image generation model generates, using the image generation model, a synthetic image based on the image generation prompt.

Accordingly, in some cases, by generating the image generation prompt based on the text generation prompt, and generating the synthetic image based on the image generation prompt, the image generation system allows a user to obtain the synthetic image without having to fully describe the synthetic image in the text generation prompt, thereby increasing user access to the image generation process.

In some cases, the target token is obtained based on a user input. Accordingly, in some cases, by generating the image generation prompt based on the target token, the image generation system allows the user to control a characteristic of the synthetic image in a more intuitive manner than by describing the characteristic using natural language.

Furthermore, in some cases, the image generation prompt attribute comprises a vocabulary attribute corresponding to words that are allowed to be included in the image generation prompt. Accordingly, by generating the synthetic image based on the image generation prompt having the vocabulary attribute, the image generation system is able to avoid harmful or undesirable content being depicted in the synthetic image.

According to some aspects, the language model is trained using an upside-down reinforcement learning approach to generate an image generation prompt having an image generation prompt attribute. In upside-down reinforcement learning, a target condition is included in an input to a machine learning model, the machine learning model generates an output based on the input, and parameters of the machine learning model are updated based on a comparison between the output and the input, such that the machine learning model learns to generate an output including the target condition.

Upside-down reinforcement learning may be compared with reinforcement learning. Reinforcement learning is a type of machine learning in which an agent model learns to make decisions by taking actions within an environment and receiving feedback for the actions in the form of rewards or penalties. Through trial and error, the agent model is reinforced to perform actions that yield maximum rewards and minimum penalties, and thereby learns a policy, or a strategy for selecting actions, which maximizes an expected cumulative reward.

By contrast, in upside-down reinforcement learning, a machine learning model does not attempt to maximize a cumulative reward over time. Instead, in some cases, the target condition acts as a pseudo-reward, and instead of learning behavior by receiving rewards for generating expected outputs, the machine learning model is trained to generate an output (for example, using supervised learning) that reflects the pseudo-reward.

Accordingly, in some cases, by training the language model based on a target condition (e.g., an image generation prompt attribute indicated by a target token), the trained language model is able to be conditioned at inference time on the target token, such that the image generation prompt has the image generation prompt attribute. In some cases, using upside-down reinforcement learning therefore allows the image generation system to avoid using a reinforcement learning model to train the language model to generate image generation prompts having the image generation prompt attribute, thereby reducing a computational expense and increasing an efficiency of the image generation system.

Furthermore, in some cases, by training the language model to understand a target token indicating the vocabulary attribute, the image generation system minimizes a trial-and-error process of generating an image generation prompt, determining if the image generation prompt includes inappropriate content, and then regenerating the image generation prompt until an image generation prompt is obtained that does not include inappropriate content, thereby increasing an efficiency of the image generation system.

An example of the present disclosure is used in a prompt suggestion context. In the example, a user wants to generate an image of a concert having a high aesthetic quality, but does not know what to enter as a prompt beyond "a concert". In the example, the user inputs a text generation prompt "a concert" to a user interface provided by the image generation system, makes a selection via an element of the user interface (e.g., a drop-down menu) that the image should have a high aesthetic quality, and indicates via another element of the user interface (e.g., a slider) that the image generation prompt should include eight words. Based on the selection and the indication, the image generation system generates an "<|aes|>" target token and an "<|8|>" target token, respectively. Furthermore, the image generation system generates an "<|ok|>" target token, indicating that only approved words and/or combinations of words should be included in the image generation prompt.

In the example, the language model generates, based on the text generation prompt and the target tokens, an image generation prompt including the text string "rock concert outdoors amphitheater starry night full moon", where the image generation prompt includes eight words, does not include inappropriate words, and is predicted to result in an image having a high aesthetic quality, because the language model has been trained to understand the <|aes|>, <|8|>, and <|ok|> target tokens. In the example, the image generation model generates a synthetic image using an image generation process conditioned on the image generation prompt and displays the synthetic image to the user via the user interface.

Figure 2:
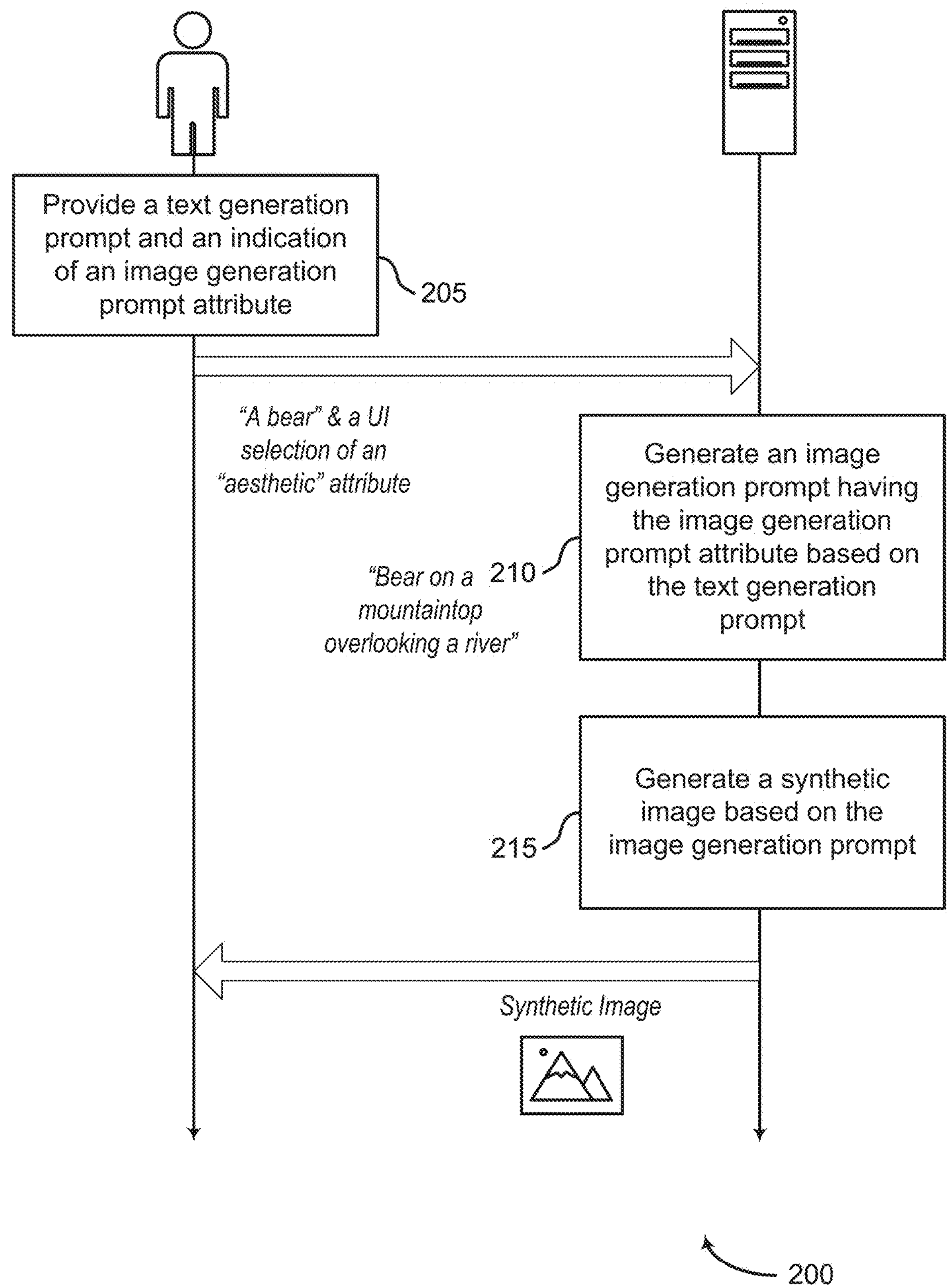
FIG. 2 shows an example of a method for generating an image based on a generated prompt according to aspects of the present disclosure.

Further example applications of the present disclosure in the prompt suggestion context are provided with reference to FIGS. 1 and 2. Details regarding the architecture of the image generation system are provided with reference to FIGS. 3-7 and 15. Examples of a process for image generation are provided with reference to FIGS. 8-9. Examples of a process for training a machine learning model are provided with reference to FIGS. 10-14.

Embodiments of the present disclosure improve upon conventional image generation systems by making a text-based image generation process more accurate and efficient. For example, some embodiments generate a synthetic image based on a system-generated prompt. Some embodiments achieve this efficiency by obtaining a text prompt and a target token indicating an attribute of the system-generated prompt, and generating the system-generated prompt using a language model that is trained to understand the target token, such that the system-generated prompt includes the attribute. In some cases, a system-generated prompt can generate a more accurate prompt that a comparable prompt generated by a user.

By contrast, conventional image generation processes rely on a user input of a completely described text prompt, and the user may not be willing or able to provide such a text prompt, which may result in an inefficient trial-and-error process until the user obtains a satisfactory image, or may result in the user abandoning the process before a satisfactory image is obtained.

Furthermore, some embodiments achieve the efficiency by using the target token to control content of the system-generated prompt, and thereby control content of the synthetic image generated based on the system-generated prompt. By contrast, some conventional image generation processes may rely on an inefficient and repetitive rejection of unacceptable user-provided text prompts until the user provides an acceptable text prompt, or the user abandons the process.

Image Generation System

A system and an apparatus for image generation are described with reference to FIGS. 1-7. One or more aspects of the system and the apparatus include at least one memory component; at least one processor executing instructions stored in the at least one memory component; a language model comprising text generation parameters stored in the at least one memory component, the language model trained to generate an image generation prompt based on a text generation prompt and a target token indicating an image generation prompt attribute, wherein the image generation prompt has the image generation prompt attribute; and an image generation model comprising image generation parameters stored in the at least one memory component, the image generation model trained to generate a synthetic image based on the image generation prompt.

Some examples of the system and the apparatus further include a language verification component configured to filter the text generation prompt or the image generation prompt. Some examples of the system and the apparatus further include a classification network configured to generate information for the target token. In some aspects, the language model comprises a transformer model. In some aspects, the image generation model comprises a diffusion model.

FIG. 1 shows an example of an image generation system 100 according to aspects of the present disclosure. The example shown includes image generation system 100, user 105, user device 110, image generation apparatus 115, cloud 120, and database 125. Image generation system 100 is an example of, or includes aspects of, the corresponding element described with reference to FIG. 7.

Referring to FIG. 1, according to some aspects, user 105 provides a text generation prompt and an indication of an image generation prompt attribute to image generation apparatus 115 of image generation system 100. In some cases, user 105 provides the text generation prompt and the indication of the image generation prompt attribute via a user interface (e.g., a graphical user interface, a text-based user interface, or a combination thereof) displayed on user device 110 by image generation apparatus 115.

In some cases, image generation apparatus 115 determines a target token corresponding to the image generation prompt attribute, and generates, using a language model, an image generation prompt based on the text generation prompt and the target token, where the image generation prompt has the image generation prompt attribute. In some cases, image generation apparatus 115 displays the image generation prompt to user 105 via the user interface.

In some cases, image generation apparatus 115 generates a synthetic image based on the image generation prompt. In some cases, image generation apparatus 115 displays the synthetic image to user 105 via the user interface.

As used herein, a "text generation prompt" refers to a text string. In some cases, the text generation prompt includes one or more words that describe an element that is intended to be depicted in a synthetic image to be generated by the image generation apparatus.

As used herein, an "image generation prompt" refers to a text string generated by the image generation apparatus. As used herein, an "image generation prompt attribute" refers to an attribute of the image generation prompt. In some cases, the image generation prompt attribute comprises an image description attribute, a vocabulary attribute, or a prompt length. In some cases, an "image description attribute" refers to an intended quality of a synthetic image to be generated based on an image generation prompt including the image description attribute. An example of an image description attribute is a high aesthetic quality. In some cases, a "vocabulary attribute" refers to an intended use of a set of allowed words for generating an image generation prompt. In some cases, a "prompt length" refers to a number of words to be included in an image generation prompt.

As used herein, a "target token" refers to a token (e.g., bracketed text) that indicates the image generation prompt attribute. In some cases, the language model is trained to understand the target token, such that the image generation prompt generated by the trained language model includes the image generation prompt attribute indicated by the target token.

As used herein, a "language model" refers to a machine learning model trained to generate a text output based on a text input.

As used herein, a "synthetic image" refers to an image generated by the image generation model. As used herein, an "image generation model" refers to a machine learning model trained to generate an image output based on a text input.

According to some aspects, user device 110 is a personal computer, laptop computer, mainframe computer, palmtop computer, personal assistant, mobile device, or any other suitable processing apparatus. In some examples, user device 110 includes software that displays a user interface (e.g., a graphical user interface, a text-based interface, or a combination thereof) provided by image generation apparatus 115. In some aspects, the user interface allows information (such as an image, a prompt, user inputs, etc.) to be communicated between user 105 and image generation apparatus 115.

According to some aspects, a user device user interface enables user 105 to interact with user device 110. In some embodiments, the user device user interface may include an audio device, such as an external speaker system, an external display device such as a display screen, or an input device (e.g., a remote-control device interfaced with the user interface directly or through an I/O controller module). In some cases, the user device user interface may be a graphical user interface.

Image generation apparatus 115 is an example of, or includes aspects of, the corresponding element described with reference to FIGS. 3 and 15. According to some aspects, image generation apparatus 115 includes a computer-implemented network. In some embodiments, the computer-implemented network includes a machine learning model (such as the machine learning model described with reference to FIG. 3). In some embodiments, image generation apparatus 115 also includes one or more processors, a memory subsystem, a communication interface, an I/O interface, one or more user interface components, and a bus as described with reference to FIG. 15. In some embodiments, image generation apparatus 115 communicates with user device 110 and database 125 via cloud 120.

In some cases, image generation apparatus 115 is implemented on a server. A server provides one or more functions to users linked by way of one or more of various networks, such as cloud 120. In some cases, the server includes a single microprocessor board, which includes a microprocessor responsible for controlling all aspects of the server. In some cases, the server uses microprocessor and protocols to exchange data with other devices or users on one or more of the networks via hypertext transfer protocol (HTTP), and simple mail transfer protocol (SMTP), although other protocols such as file transfer protocol (FTP), and simple network management protocol (SNMP) may also be used. In some cases, the server is configured to send and receive hypertext markup language (HTML) formatted files (e.g., for displaying web pages). In various embodiments, the server comprises a general-purpose computing device, a personal computer, a laptop computer, a mainframe computer, a supercomputer, or any other suitable processing apparatus.

Further detail regarding the architecture of image generation apparatus 115 is provided with reference to FIGS. 3-7 and 15. Further detail regarding a process for image generation is provided with reference to FIGS. 2 and 8-9. Examples of a process for training a machine learning model are provided with reference to FIGS. 10-14.

Cloud 120 is a computer network configured to provide on-demand availability of computer system resources, such as data storage and computing power. In some examples, cloud 120 provides resources without active management by a user. The term "cloud" is sometimes used to describe data centers available to many users over the Internet. Some large cloud networks have functions distributed over multiple locations from central servers. A server is designated an edge server if the server has a direct or close connection to a user. In some cases, cloud 120 is limited to a single organization. In other examples, cloud 120 is available to many organizations. In one example, cloud 120 includes a multi-layer communications network comprising multiple edge routers and core routers. In another example, cloud 120 is based on a local collection of switches in a single physical location. According to some aspects, cloud 120 provides communications between user device 110, image generation apparatus 115, and database 125.

Database 125 is an organized collection of data. In an example, database 125 stores data in a specified format known as a schema. According to some aspects, database 125 is structured as a single database, a distributed database, multiple distributed databases, or an emergency backup database. In some cases, a database controller manages data storage and processing in database 125. In some cases, a user interacts with the database controller. In other cases, the database controller operates automatically without interaction from the user. According to some aspects, database 125 is external to image generation apparatus 115 and communicates with image generation apparatus 115 via cloud 120. According to some aspects, database 125 is included in image generation apparatus 115.

FIG. 2 shows an example of a method 200 for generating an image based on a generated prompt according to aspects of the present disclosure. In some examples, these operations are performed by a system including a processor executing a set of codes to control functional elements of an apparatus. Additionally or alternatively, certain processes are performed using special-purpose hardware. Generally, these operations are performed according to the methods and processes described in accordance with aspects of the present disclosure. In some cases, the operations described herein are composed of various substeps, or are performed in conjunction with other operations.

Referring to FIG. 2, an image generation system (such as the image generation system described with reference to FIGS. 1 and 7) may be used in a prompt suggestion context. For example, in some cases, the image generation system receives a text prompt from a user, where the text prompt is intended to describe an element of an image to be generated. In some cases, the image generation system generates an image generation prompt (e.g., a prompt including a text string) based on the text prompt and including one or more attributes, where the one or more attributes relate to one or more of an image quality of the image to be generated, a number of words to be included in the image generation prompt, or a restriction on words and/or phrases that are allowed to be included in the image generation prompt.

In an example, the user provides a text prompt "a bear", and provides an indication to a user interface of the image generation system that the image to be generated should be of a high aesthetic quality. In response to the text prompt and the indication, the image generation system generates an image generation prompt that will result in a synthetic image of a high aesthetic quality being generated when the image generation prompt is used to condition an image generation process that generates the synthetic image.

In a further example, the user provides a text prompt "a bear", and provides an indication to a user interface of the image generation system that the image generation prompt should include 10 words. In response to the text prompt and the indication, the image generation system generates an image generation prompt that includes 10 words.

In a further example, the user provides a text prompt "a bear". In response to the text prompt, the image generation system generates an image generation prompt using words that have been approved for use in the generation of image generation prompts.

In some cases, the image generation system then generates a synthetic image based on the image generation prompt. Accordingly, by suggesting a completed prompt (e.g., the image generation prompt) to a user based on an initial prompt (e.g., the text prompt), and generating the synthetic image based on the completed prompt, the image generation system allows a user to obtain the synthetic image without having to fully describe the synthetic image in the initial prompt, thereby making the image generation process easier for the user to access.

Furthermore, in some cases, by generating the image generation prompt based on an image description attribute, the image generation system allows the user to control an appearance of the synthetic image in a more intuitive manner than by describing the attribute using natural language. Finally, in some cases, by generating the image generation prompt using approved vocabulary and/or phrases, the image generation system is able to avoid harmful or undesirable content being depicted in the synthetic image.

At operation 205, a user provides a text generation prompt and an indication of an image generation prompt attribute. In some cases, the operations of this step refer to, or may be performed by, a user as described with reference to FIG. 1. For example, in some cases, the user provides the text generation prompt by entering a text string into a user interface provided on a user device (such as the user device described with reference to FIG. 1) by an image generation apparatus (such as the image generation apparatus as described with reference to FIGS. 1, 3, and 15). In some cases, the user provides the identification of the image generation prompt attribute to the user interface (for example, by providing an input to an element of the user interface, such as a drop-down menu, a slider, or the like).

In an example, a user enters a text generation prompt "a bear" into a text prompt element of the user interface, and indicates an image generation prompt attribute by selecting an "aesthetic" attribute from a drop-down element of the user interface.

At operation 210, the system generates an image generation prompt having the image generation prompt attribute based on the text generation prompt. In some cases, the operations of this step refer to, or may be performed by, an image generation apparatus as described with reference to FIGS. 1, 3 and 15. For example, in some cases, the image generation apparatus generates the image generation prompt using a language model as described with reference to FIG. 8. In some cases, the image generation apparatus displays the image generation prompt to the user via the user interface. In an example, the language model generates an image generation prompt "bear on a mountaintop overlooking a river" based on the text generation prompt and the "aesthetic" attribute.

At operation 215, the system generate a synthetic image based on the image generation prompt. In some cases, the operations of this step refer to, or may be performed by, an image generation apparatus as described with reference to FIGS. 1, 3 and 15. For example, in some cases, the image generation apparatus generates the image using an image generation model as described with reference to FIG. 8. In an example, the image generation model generates a synthetic image depicting a bear on a mountaintop overlooking a river based on the image generation prompt. In some cases, the image generation apparatus displays the synthetic image to the user via the user interface.

Figure 3:
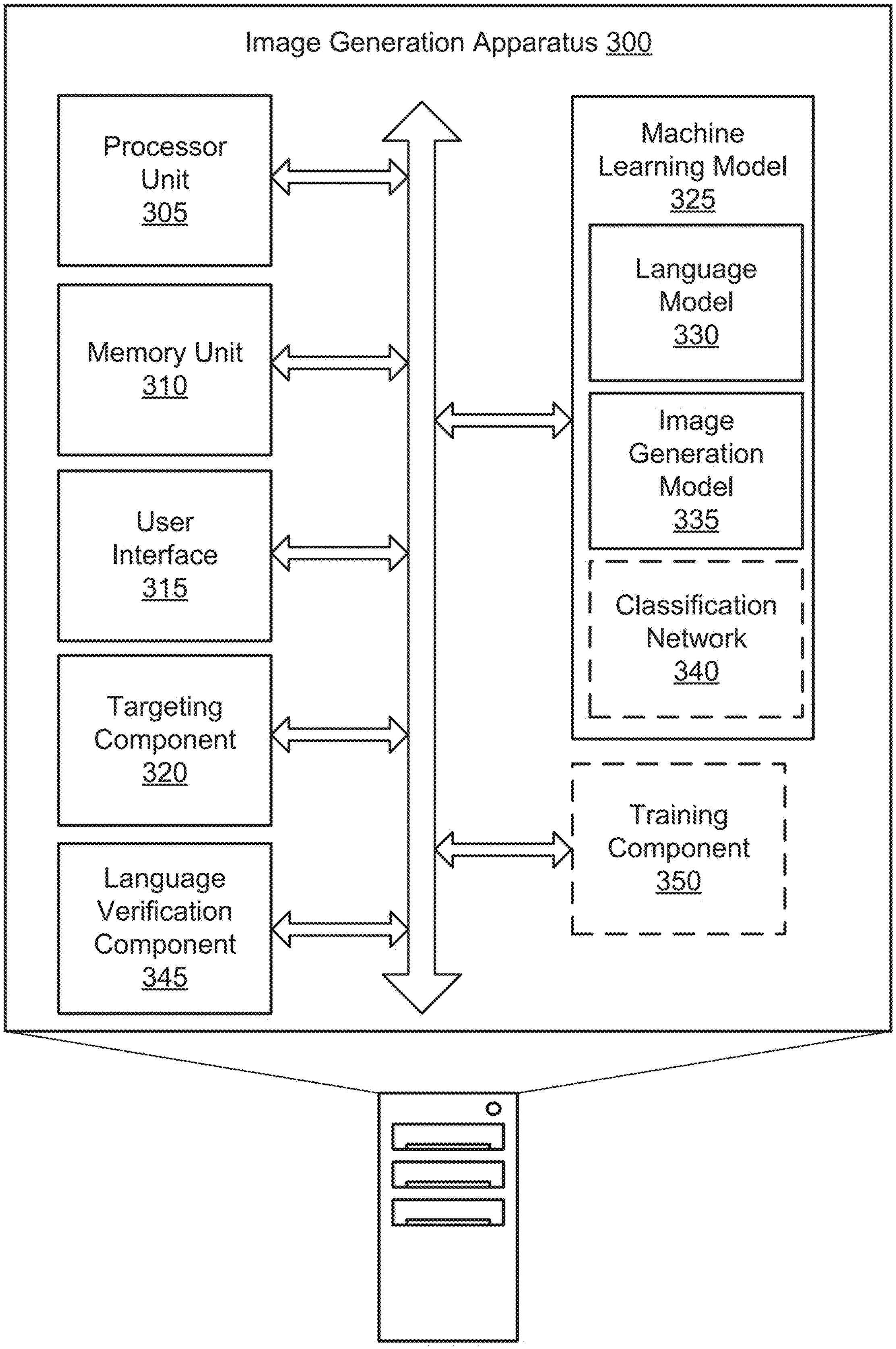
FIG. 3 shows an example of an image generation apparatus according to aspects of the present disclosure.

FIG. 3 shows an example of an image generation apparatus 300 according to aspects of the present disclosure. Image generation apparatus 300 is an example of, or includes aspects of, the corresponding element described with reference to FIGS. 1 and 15. In one aspect, image generation apparatus 300 includes processor unit 305, memory unit 310, user interface 315, targeting component 320, machine learning model 325, language verification component 345, and training component 350.

According to some aspects, processor unit 305 comprises one or more processors. A processor is an intelligent hardware device, such as a general-purpose processing component, a digital signal processor (DSP), a central processing unit (CPU), a graphics processing unit (GPU), a microcontroller, an application specific integrated circuit (ASIC), a field programmable gate array (FPGA), a programmable logic device, a discrete gate or transistor logic component, a discrete hardware component, or any combination thereof.

In some cases, processor unit 305 is configured to operate a memory array using a memory controller. In other cases, a memory controller is integrated into processor unit 305. In some cases, processor unit 305 is configured to execute computer-readable instructions stored in memory unit 310 to perform various functions. In some aspects, processor unit 305 includes special purpose components for modem processing, baseband processing, digital signal processing, or transmission processing. According to some aspects, processor unit 305 comprises the one or more processors described with reference to FIG. 15.

According to some aspects, memory unit 310 comprises one or more memory components coupled with the one or more processors. In some cases, memory unit 310 includes one or more memory devices. Examples of a memory device include random access memory (RAM), read-only memory (ROM), or a hard disk. Examples of memory devices include solid state memory and a hard disk drive. In some examples, memory is used to store computer-readable, computer-executable software including instructions that, when executed, cause at least one processor of processor unit 305 to perform various functions described herein.

In some cases, memory unit 310 includes a basic input/output system (BIOS) that controls basic hardware or software operations, such as an interaction with peripheral components or devices. In some cases, memory unit 310 includes a memory controller that operates memory cells of memory unit 310. For example, the memory controller may include a row decoder, column decoder, or both. In some cases, memory cells within memory unit 310 store information in the form of a logical state. According to some aspects, memory unit 310 comprises the memory subsystem described with reference to FIG. 15.

According to some aspects, user interface 315 is implemented as software stored in memory unit 310 and executable by processor unit 305, as firmware, as one or more hardware circuits, or as a combination thereof. According to some aspects, user interface 315 is a graphical user interface (GUI), a text-based user interface, or a combination thereof. According to some aspects, user interface 315 is displayed by image generation apparatus 300 on a user device (such as the user device described with reference to FIG. 1). According to some aspects, user interface 315 receives a user input indicating the image generation prompt attribute.

Targeting component 320 is an example of, or includes aspects of, the corresponding element described with reference to FIG. 7. According to some aspects, targeting component 320 is implemented as software stored in memory unit 310 and executable by processor unit 305, as firmware, as one or more hardware circuits, or as a combination thereof.

According to some aspects, targeting component 320 obtains a text generation prompt and a target token indicating an image generation prompt attribute. In some examples, targeting component 320 identifies a target attribute for the synthetic image. In some examples, targeting component 320 selects the target token based on the target attribute. In some aspects, the image generation prompt attribute includes an image description attribute, a vocabulary attribute, or a prompt length.

In some aspects, the target token includes a nonce token used to train language model 330. In some examples, targeting component 320 appends the target token to the text generation prompt to obtain an annotated text generation prompt.

According to some aspects, machine learning model 325 includes language model 330, image generation model 335, and classification network 340. According to some aspects, machine learning model 325 is implemented as software stored in memory unit 310 and executable by processor unit 305, as firmware, as one or more hardware circuits, or as a combination thereof. According to some aspects, machine learning model 325 comprises machine learning parameters stored in memory unit 310.

Machine learning parameters, also known as model parameters or weights, are variables that provide a behavior and characteristics of a machine learning model. Machine learning parameters can be learned or estimated from training data and are used to make predictions or perform tasks based on learned patterns and relationships in the data.

Machine learning parameters are adjusted during a training process to minimize a loss function or maximize a performance metric. The goal of the training process is to find optimal values for the parameters that allow the machine learning model to make accurate predictions or perform well on the given task.

For example, during the training process, an algorithm adjusts machine learning parameters to minimize an error or loss between predicted outputs and actual targets according to optimization techniques like gradient descent, stochastic gradient descent, or other optimization algorithms. Once the machine learning parameters are learned from the training data, the machine learning parameters are used to make predictions on new, unseen data.

Artificial neural networks (ANNs) have numerous parameters, including weights and biases associated with each neuron in the network, which control a degree of connections between neurons and influence the neural network's ability to capture complex patterns in data.

An ANN is a hardware component or a software component that includes a number of connected nodes (i.e., artificial neurons) that loosely correspond to the neurons in a human brain. Each connection, or edge, transmits a signal from one node to another (like the physical synapses in a brain). When a node receives a signal, the node processes the signal and then transmits the processed signal to other connected nodes.

In some cases, the signals between nodes comprise real numbers, and the output of each node is computed by a function of the sum of the inputs of each node. In some examples, nodes may determine the output using other mathematical algorithms, such as selecting the max from the inputs as the output, or any other suitable algorithm for activating the node. Each node and edge are associated with one or more node weights that determine how the signal is processed and transmitted.

In ANNs, a hidden (or intermediate) layer includes hidden nodes and is located between an input layer and an output layer. Hidden layers perform nonlinear transformations of inputs entered into the network. Each hidden layer is trained to produce a defined output that contributes to a joint output of the output layer of the ANN. Hidden representations are machine-readable data representations of an input that are learned from hidden layers of the ANN and are produced by the output layer. As the understanding of the ANN of the input improves as the ANN is trained, the hidden representation is progressively differentiated from earlier iterations.

During a training process of an ANN, the node weights are adjusted to increase the accuracy of the result (e.g., by minimizing a loss which corresponds in some way to the difference between the current result and the target result). The weight of an edge increases or decreases the strength of the signal transmitted between nodes. In some cases, nodes have a threshold below which a signal is not transmitted at all. In some examples, the nodes are aggregated into layers. Different layers perform different transformations on their inputs. The initial layer is known as the input layer and the last layer is known as the output layer. In some cases, signals traverse certain layers multiple times.

Language model 330 is an example of, or includes aspects of, the corresponding element described with reference to FIGS. 4 and 7. According to some aspects, language model 330 is implemented as software stored in memory unit 310 and executable by processor unit 305, as firmware, as one or more hardware circuits, or as a combination thereof. According to some aspects, language model 330 comprises text generation parameters (e.g., machine learning parameters) stored in memory unit 310.

According to some aspects, language model 330 is trained to generate an image generation prompt based on a text generation prompt and a target token indicating an image generation prompt attribute, wherein the image generation prompt has the image generation prompt attribute. In some aspects, language model 330 is trained to generate the image generation prompt having the image generation prompt attribute. In some aspects, language model 330 is trained based on a synthetic image. In some aspects, language model 330 generates the image generation prompt based on the annotated text generation prompt. In some aspects, language model 330 generates a predicted image generation prompt.

In some cases, language model 330 comprises a large language model. In some cases, a large language model comprises one or more ANNs trained to understand and generate human-like text based on large amounts of data. In some cases, by analyzing input text data, a large language model learns patterns and structures of human language.

In some aspects, the language model 330 includes one or more transformer models (e.g., transformers). In some cases, a transformer comprises one or more ANNs comprising attention mechanisms that enable the transformer to weigh an importance of different words or tokens within a sequence. In some cases, a transformer processes entire sequences simultaneously in parallel, making the transformer highly efficient and allowing the transformer to capture long-range dependencies more effectively.

In some cases, a transformer comprises an encoder-decoder structure. In some cases, the encoder of the transformer processes an input sequence and encodes the input sequence into a set of high-dimensional representations. In some cases, the decoder of the transformer generates an output sequence based on the encoded representations and previously generated tokens. In some cases, the encoder and the decoder are composed of multiple layers of self-attention mechanisms and feed-forward ANNs.

In some cases, the self-attention mechanism allows the transformer to focus on different parts of an input sequence while computing representations for the input sequence. In some cases, the self-attention mechanism captures relationships between words of a sequence by assigning attention weights to each word based on a relevance to other words in the sequence, thereby enabling the transformer to model dependencies regardless of a distance between words.

An attention mechanism is a key component in some ANN architectures, particularly ANNs employed in natural language processing (NLP) and sequence-to-sequence tasks, which allows an ANN to focus on different parts of an input sequence when making predictions or generating output.

NLP refers to techniques for using computers to interpret or generate natural language. In some cases, NLP tasks involve assigning annotation data such as grammatical information to words or phrases within a natural language expression. Different classes of machine-learning algorithms have been applied to NLP tasks. Some algorithms, such as decision trees, utilize hard if-then rules. Other systems use neural networks or statistical models which make soft, probabilistic decisions based on attaching real-valued weights to input features. In some cases, these models express the relative probability of multiple answers.

Some sequence models process an input sequence sequentially, maintaining an internal hidden state that captures information from previous steps. However, in some cases, this sequential processing leads to difficulties in capturing long-range dependencies or attending to specific parts of the input sequence.

The attention mechanism addresses these difficulties by enabling an ANN to selectively focus on different parts of an input sequence, assigning varying degrees of importance or attention to each part. The attention mechanism achieves the selective focus by considering a relevance of each input element with respect to a current state of the ANN.

In some cases, an ANN employing an attention mechanism receives an input sequence and maintains the current state, which represents an understanding or context. For each element in the input sequence, the attention mechanism computes an attention score that indicates the importance or relevance of that element given the current state. The attention scores are transformed into attention weights through a normalization process, such as applying a softmax function. The attention weights represent the contribution of each input element to the overall attention. The attention weights are used to compute a weighted sum of the input elements, resulting in a context vector. The context vector represents the attended information or the part of the input sequence that the ANN considers most relevant for the current step. The context vector is combined with the current state of the ANN, providing additional information and influencing subsequent predictions or decisions of the ANN.

In some cases, by incorporating an attention mechanism, an ANN dynamically allocates attention to different parts of the input sequence, allowing the ANN to focus on relevant information and capture dependencies across longer distances.

In some cases, calculating attention involves three basic steps. First, a similarity between a query vector Q and a key vector K obtained from the input is computed to generate attention weights. In some cases, similarity functions used for this process include dot product, splice, detector, and the like. Next, a softmax function is used to normalize the attention weights. Finally, the attention weights are weighed together with their corresponding values V. In the context of an attention network, the key K and value V are vectors or matrices that are used to represent the input data. The key K is used to determine which parts of the input the attention mechanism should focus on, while the value V is used to represent the actual data being processed. An example of a transformer is described in further detail with reference to FIG. 4.

Image generation model 335 is an example of, or includes aspects of, the corresponding element described with reference to FIGS. 5-7, 9, and 14. According to some aspects, image generation model 335 is implemented as software stored in memory unit 310 and executable by processor unit 305, as firmware, as one or more hardware circuits, or as a combination thereof. According to some aspects, image generation model 335 comprises image generation parameters (e.g., machine learning parameters) stored in memory unit 310. According to some aspects, image generation model 335 is trained to generate a synthetic image based on the image generation prompt.

In some cases, image generation model 335 comprises a generative adversarial network (GAN). In some cases, image generation model 335 comprises a diffusion model, such as the diffusion model described with reference to FIGS. 5-6.

In some cases, a GAN comprises two neural networks (e.g., a generator and a discriminator) that are trained based on a contest with each other. For example, in some cases, the generator learns to generate a candidate by mapping information from a latent space to a data distribution of interest, while the discriminator distinguishes the candidate produced by the generator from a true data distribution of the data distribution of interest. In some cases, the generator's training objective is to increase an error rate of the discriminator by producing novel candidates that the discriminator classifies as "real" (e.g., belonging to the true data distribution).

According to some aspects, classification network 340 is implemented as software stored in memory unit 310 and executable by processor unit 305, as firmware, as one or more hardware circuits, or as a combination thereof. According to some aspects, classification network 340 comprises classification parameters (e.g., machine learning parameters) stored in memory unit 310.

According to some aspects, classification network 340 is omitted from image generation apparatus 300 and/or machine learning model 325. According to some aspects, classification network 340 is comprised in the image generation system in a separate apparatus from image generation apparatus 300. According to some aspects, classification network 340 is implemented as software stored in a memory unit of the separate apparatus and executable by a processor unit of the separate apparatus, as firmware of the separate apparatus, as one or more hardware circuits of the separate apparatus, or as a combination thereof. According to some aspects, the encoding parameters are stored in the memory unit of the separate apparatus.

According to some aspects, classification network 340 is configured to generate information for the target token. According to some aspects, classification network 340 classifies the synthetic image according to an image attribute. In some examples, classification network 340 classifies the input prompt according to the image attribute based on the classification of the synthetic image.

According to some aspects, classification network 340 comprises a convolutional neural network (CNN). In some cases, a CNN may enable processing of digital images with minimal pre-processing. A CNN may be characterized by the use of convolutional (or cross-correlational) hidden layers. These layers apply a convolution operation to the input before signaling the result to the next layer. Each convolutional node may process data for a limited field of input (i.e., the receptive field). During a forward pass of the CNN, filters at each layer may be convolved across the input volume, computing the dot product between the filter and the input. During a training process, the filters may be modified so that they activate when they detect a particular feature within the input.

According to some aspects, language verification component 345 is implemented as software stored in memory unit 310 and executable by processor unit 305, as firmware, as one or more hardware circuits, or as a combination thereof. According to some aspects, language verification component 345 is configured to filter the text generation prompt or the image generation prompt.

According to some aspects, language verification component 345 filters the text generation prompt based on a content filter. In some examples, language verification component 345 filters the image generation prompt based on a content filter. According to some aspects, language verification component 345 determines whether the predicted image generation prompt includes inappropriate content.

According to some aspects, training component 350 is implemented as software stored in memory unit 310 and executable by processor unit 305, as firmware, as one or more hardware circuits, or as a combination thereof. According to some aspects, training component 350 is omitted from image generation apparatus 300. According to some aspects, training component 350 is comprised in the generative system in a separate apparatus from image generation apparatus 300. According to some aspects, training component 350 is implemented as software stored in a memory unit of the separate apparatus and executable by a processor unit of the separate apparatus, as firmware of the separate apparatus, as one or more hardware circuits of the separate apparatus, or as a combination thereof.

According to some aspects, training component 350 obtains training data including a training input text and a target token indicating an image generation prompt attribute. In some examples, training component 350 trains, using the training data, language model 330 to generate an image generation prompt based on the training input text and the target token.

In some examples, training component 350 computes an image attribute loss based on the classification of the input prompt. In some examples, training component 350 updates parameters of language model 330 based on the image attribute loss.

In some examples, training component 350 computes a length of the predicted image generation prompt. In some examples, training component 350 computes a length loss based on the length. In some examples, training component 350 updates parameters of language model 330 based on the length loss.

In some examples, training component 350 computes a content loss based on the determination. In some examples, training component 350 updates parameters of language model 330 based on the content loss.

Figure 4:
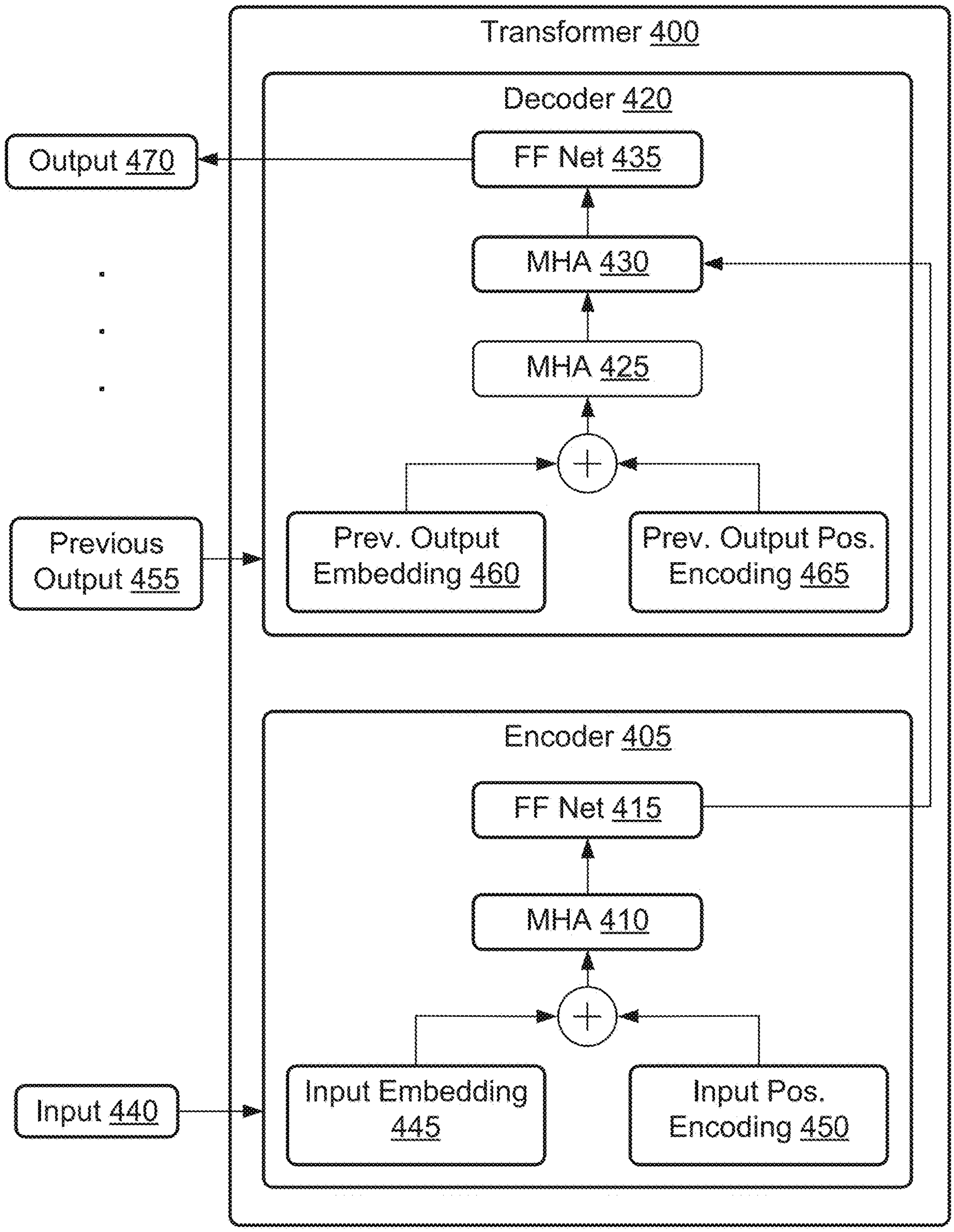
FIG. 4 shows an example of a transformer according to aspects of the present disclosure.

FIG. 4 shows an example of a transformer 400 included in a language model (such as the language model described with reference to FIGS. 3 and 7) according to aspects of the present disclosure. The example shown includes transformer 400, encoder 405, decoder 420, input 440, input embedding 445, input positional encoding 450, previous output 455, previous output embedding 460, previous output positional encoding 465, and output 470.

In some cases, encoder 405 includes multi-head self-attention sublayer 410 and feed-forward network sublayer 415. In some cases, decoder 420 includes first multi-head self-attention sublayer 425, second multi-head self-attention sublayer 430, and feed-forward network sublayer 435.

In some cases, encoder 405 is configured to map input 440 (for example, a text generation prompt and a target token, or an annotated text generation prompt) to a sequence of continuous representations that are fed into decoder 420. In some cases, decoder 420 generates output 470 (e.g., a prediction of an output sequence of words or tokens) based on the output of encoder 405 and previous output 455 (e.g., a previously predicted output sequence), which allows for the use of autoregression.

For example, in some cases, encoder 405 parses input 440 into tokens and vectorizes the parsed tokens to obtain input embedding 445, and adds input positional encoding 450 (e.g., positional encoding vectors for input 440 of a same dimension as input embedding 445) to input embedding 445. In some cases, input positional encoding 450 includes information about relative positions of words or tokens in input 440.

In some cases, encoder 405 comprises one or more encoding layers that generate contextualized token representations, where each representation corresponds to a token that combines information from other input tokens via self-attention mechanism. In some cases, each encoding layer of encoder 405 comprises a multi-head self-attention sublayer (e.g., multi-head self-attention sublayer 410). In some cases, the multi-head self-attention sublayer implements a multi-head self-attention mechanism that receives different linearly projected versions of queries, keys, and values to produce outputs in parallel. In some cases, each encoding layer of encoder 405 also includes a fully connected feed-forward network sublayer (e.g., feed-forward network sublayer 415) comprising two linear transformations surrounding a Rectified Linear Unit (ReLU) activation:

$$FFN(x) = ReLU(W_1x + b_1)W_2 + b_2 \quad (1)$$

In some cases, each layer employs different weight parameters ($W_1$, $W_2$) and different bias parameters ($b_1$, $b_2$) to apply a same linear transformation each word or token in input 440.

In some cases, each sublayer of encoder 405 is followed by a normalization layer that normalizes a sum computed between a sublayer input x and an output sublayer(x) generated by the sublayer:

$$layernorm(x + sublayer(x)) \quad (2)$$

In some cases, encoder 405 is bidirectional because encoder 405 attends to each word or token in input 440 regardless of a position of the word or token in input 440.

In some cases, decoder 420 comprises one or more decoding layers (e.g., six decoding layers). In some cases, each decoding layer comprises three sublayers including a first multi-head self-attention sublayer (e.g., first multi-head self-attention sublayer 425), a second multi-head self-attention sublayer (e.g., second multi-head self-attention sublayer 430), and a feed-forward network sublayer (e.g., feed-forward network sublayer 435). In some cases, each sublayer of decoder 420 is followed by a normalization layer that normalizes a sum computed between a sublayer input x and an output sublayer(x) generated by the sublayer.

In some cases, decoder 420 generates previous output embedding 460 of previous output 455 and adds previous output positional encoding 465 (e.g., position information for words or tokens in previous output 455) to previous output embedding 460. In some cases, each first multi-head self-attention sublayer receives the combination of previous output embedding 460 and previous output positional encoding 465 and applies a multi-head self-attention mechanism to the combination. In some cases, for each word in an input sequence, each first multi-head self-attention sublayer of decoder 420 attends only to words preceding the word in the sequence, and so a prediction of transformer 400 for a word at a particular position only depends on known outputs for a word that came before the word in the sequence. For example, in some cases, each first multi-head self-attention sublayer implements multiple single-attention functions in parallel by introducing a mask over values produced by the scaled multiplication of matrices Q and K by suppressing matrix values that would otherwise correspond to disallowed connections.

In some cases, each second multi-head self-attention sublayer implements a multi-head self-attention mechanism similar to the multi-head self-attention mechanism implemented in each multi-head self-attention sublayer of encoder 405 by receiving a query Q from a previous sublayer of decoder 420 and a key K and a value V from the output of encoder 405, allowing decoder 420 to attend to each word in the input 440.

In some cases, each feed-forward network sublayer implements a fully connected feed-forward network similar to feed-forward network sublayer 415. In some cases, the feed-forward network sublayers are followed by a linear transformation and a softmax to generate a prediction of output 470 (e.g., an image generation prompt).

Figure 5:
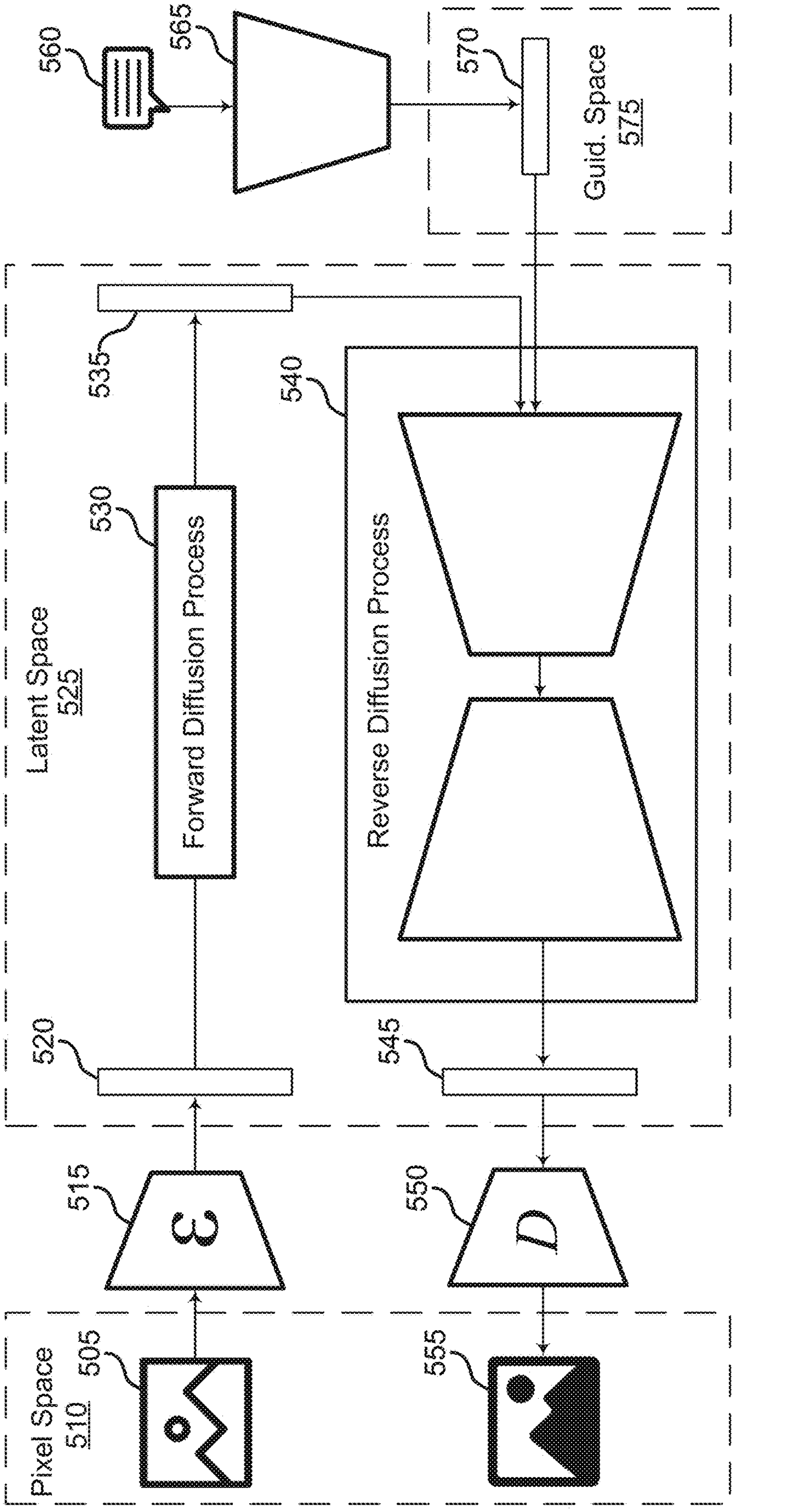
FIG. 5 shows an example of a guided diffusion architecture according to aspects of the present disclosure.

FIG. 5 shows an example of a guided diffusion architecture 500 according to aspects of the present disclosure. The example shown includes original image 505, pixel space 510, image encoder 515, original image features 520, latent space 525, forward diffusion process 530, noisy features 535, reverse diffusion process 540, denoised image features 545, image decoder 550, output image 555, prompt 560, encoder 565, guidance features 570, and guidance space 575.

Diffusion models (such as the image generation model described with reference to FIGS. 3, 6-7, 9, and 14) are a class of generative ANNs that can be trained to generate new data with features similar to features found in training data. In particular, diffusion models can be used to generate novel images. Diffusion models can be used for various image generation tasks, including image super-resolution, generation of images with perceptual metrics, conditional generation (e.g., generation based on text guidance), image inpainting, and image manipulation.

Diffusion models function by iteratively adding noise to data during a forward diffusion process and then learning to recover the data by denoising the data during a reverse diffusion process. Examples of diffusion models include Denoising Diffusion Probabilistic Models (DDPMs) and Denoising Diffusion Implicit Models (DDIMs). In DDPMs, a generative process includes reversing a stochastic Markov diffusion process. On the other hand, DDIMs use a deterministic process so that a same input results in a same output. Diffusion models may also be characterized by whether noise is added to an image itself, or to image features generated by an encoder, as in latent diffusion.

For example, according to some aspects, image encoder 515 encodes original image 505 from pixel space 510 and generates original image features 520 in latent space 525. According to some aspects, forward diffusion process 530 gradually adds noise to original image features 520 to obtain noisy features 535 in latent space 525 at various noise levels. In some cases, forward diffusion process 530 is implemented as the forward diffusion process described with reference to FIG. 9 or 14. In some cases, forward diffusion process 530 is implemented by an image generation apparatus (such as the image generation apparatus described with reference to FIGS. 1, 3, and 15) or by a training component (such as the training component described with reference to FIG. 3).

According to some aspects, reverse diffusion process 540 is applied to noisy features 535 to gradually remove the noise from noisy features 535 at the various noise levels to obtain denoised image features 545 (e.g., intermediate noise states) in latent space 525. In some cases, reverse diffusion process 540 is implemented as the reverse diffusion process described with reference to FIG. 9 or 14. In some cases, reverse diffusion process 540 is implemented by an image generation model (such as the image generation model described with reference to FIGS. 3, 6-7, 9, and 14). In some cases, reverse diffusion process 540 is implemented by a U-Net ANN included in the image generation model (such as the U-Net ANN described with reference to FIG. 6).

According to some aspects, the training component compares denoised image features 545 to original image features 520 at each of the various noise levels, and updates image generation parameters of the image generation model based on the comparison. In some cases, image decoder 550 decodes denoised image features 545 to obtain output image 555 (e.g., a synthetic image) in pixel space 510. In some cases, an output image 555 is created at each of the various noise levels. In some cases, the training component compares output image 555 to original image 505 to train the diffusion model.

In some cases, image encoder 515 and image decoder 550 are pretrained prior to training the image generation model. In some examples, image encoder 515, image decoder 550, and the image generation model are jointly trained. In some cases, image encoder 515 and image decoder 550 are jointly fine-tuned with the image generation model.

According to some aspects, reverse diffusion process 540 is guided based on a guidance prompt such as prompt 560 (e.g., an image generation prompt). In some cases, prompt 560 is encoded using encoder 565 to obtain guidance features 570 in guidance space 575. In some cases, guidance features 570 are combined with noisy features 535 at one or more layers of reverse diffusion process 540 to encourage output image 555 to include content described by prompt 560. For example, guidance features 570 can be combined with noisy features 535 using a cross-attention block within reverse diffusion process 540.

Cross-attention, also known as multi-head attention, is an extension of the attention mechanism used in some ANNs for NLP tasks. In some cases, cross-attention enables reverse diffusion process 540 to attend to multiple parts of an input sequence simultaneously, capturing interactions and dependencies between different elements. Cross-attention uses a query sequence and a key-value sequence as input sequences. The query sequence represents elements that require attention, while the key-value sequence represents elements to attend to. In some cases, to compute cross-attention, the cross-attention block transforms (for example, using linear projection) each element in the query sequence into a "query" representation, while the elements in the key-value sequence are transformed into "key" and "value" representations.

The cross-attention block calculates attention scores by measuring a similarity between each query representation and the key representations, where a higher similarity indicates that more attention is given to a key element. An attention score indicates an importance or relevance of each key element to a corresponding query element.

The cross-attention block then normalizes the attention scores to obtain attention weights (for example, using a softmax function), where the attention weights determine how much information from each value element is incorporated into the final attended representation. By attending to different parts of the key-value sequence simultaneously, the cross-attention block captures relationships and dependencies across the input sequences, allowing reverse diffusion process 540 to understand the context and generate more accurate and contextually relevant outputs.

According to some aspects, image encoder 515 and image decoder 550 are omitted, and forward diffusion process 530 and reverse diffusion process 540 occur in pixel space 510. For example, in some cases, forward diffusion process 530 adds noise to original image 505 to obtain noisy images (e.g., intermediate noise states) in pixel space 510, rather than noisy image features in a latent space, and reverse diffusion process 540 gradually removes noise from the noisy images to obtain output image 555 in pixel space 510.

Figure 6:
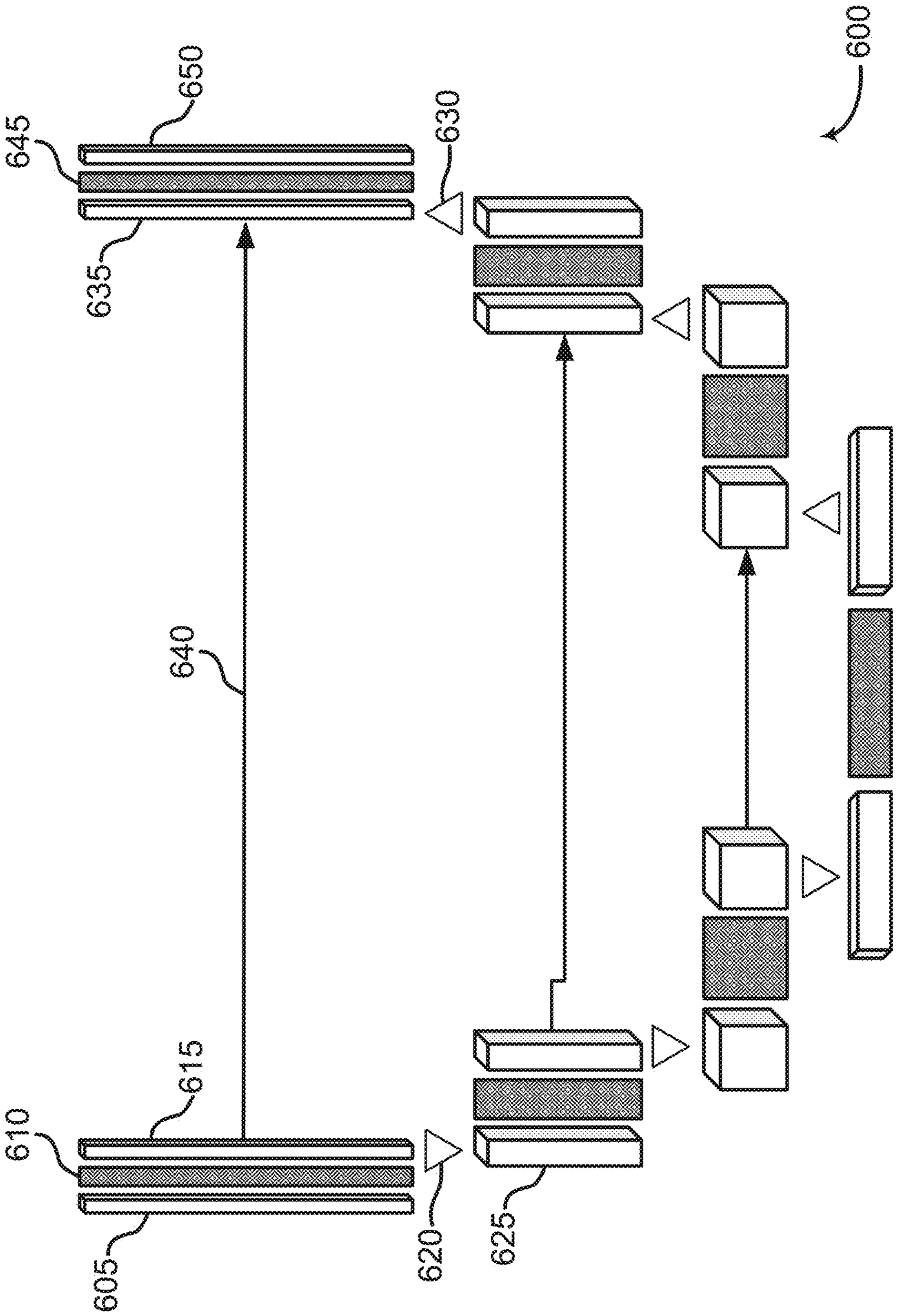
FIG. 6 shows an example of a U-Net according to aspects of the present disclosure.

FIG. 6 shows an example of a U-Net 600 according to aspects of the present disclosure. The example shown includes U-Net 600, input features 605, initial neural network layer 610, intermediate features 615, down-sampling layer 620, down-sampled features 625, up-sampling process 630, up-sampled features 635, skip connection 640, final neural network layer 645, and output features 650.

According to some aspects, an image generation model (such as the image generation model described with reference to FIGS. 3, 5, 7, 9, and 14) comprises an ANN architecture known as a U-Net. In some cases, U-Net 600 implements the reverse diffusion process described with reference to FIG. 5, 9, or 14.

According to some aspects, U-Net 600 receives input features 605, where input features 605 include an initial resolution and an initial number of channels, and processes input features 605 using an initial neural network layer 610 (e.g., a convolutional neural network layer) to produce intermediate features 615.

In some cases, intermediate features 615 are then down-sampled using a down-sampling layer 620 such that down-sampled features 625 have a resolution less than the initial resolution and a number of channels greater than the initial number of channels.

In some cases, this process is repeated multiple times, and then the process is reversed. For example, down-sampled features 625 are up-sampled using up-sampling process 630 (or an up-sampling layer) to obtain up-sampled features 635. In some cases, up-sampled features 635 are combined with intermediate features 615 having a same resolution and number of channels via skip connection 640. In some cases, the combination of intermediate features 615 and up-sampled features 635 are processed using final neural network layer 645 to produce output features 650. In some cases, output features 650 have the same resolution as the initial resolution and the same number of channels as the initial number of channels.

According to some aspects, U-Net 600 receives additional input features to produce a conditionally generated output. In some cases, the additional input features include a vector representation of an input prompt. In some cases, the additional input features are combined with intermediate features 615 within U-Net 600 at one or more layers. For example, in some cases, a cross-attention module is used to combine the additional input features and intermediate features 615.

Figure 7:
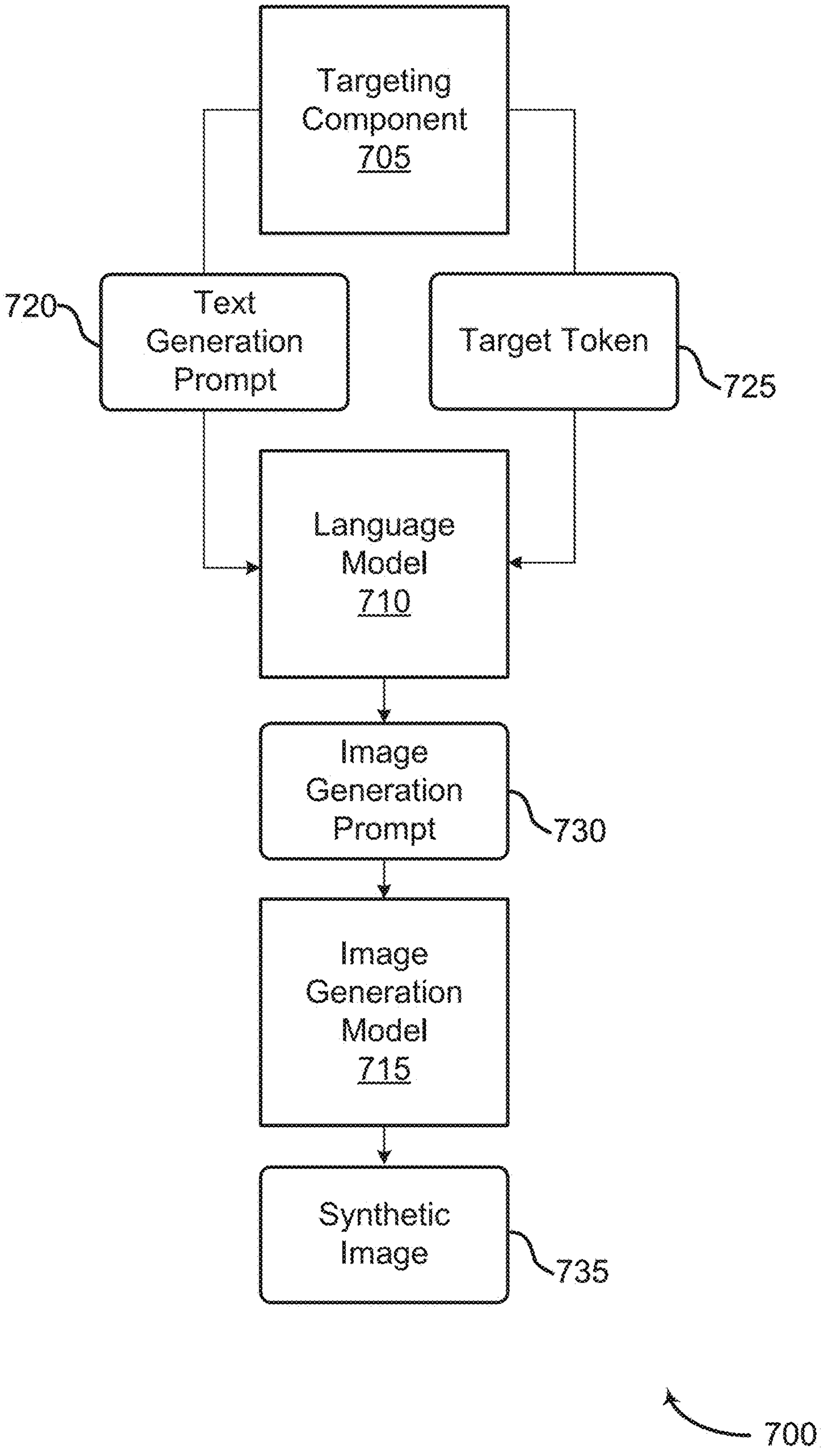
FIG. 7 shows an example of data flow in an image generation system according to aspects of the present disclosure.

FIG. 7 shows an example of data flow in an image generation system 700 according to aspects of the present disclosure. The example shown includes image generation system 700, text generation prompt 720, target token 725, image generation prompt 730, and synthetic image 735.

Image generation system 700 is an example of, or includes aspects of, the corresponding element described with reference to FIG. 1. In one aspect, image generation system 700 includes targeting component 705, language model 710, and image generation model 715. Targeting component 705 is an example of, or includes aspects of, the corresponding element described with reference to FIG. 3. Language model 710 is an example of, or includes aspects of, the corresponding element described with reference to FIGS. 3 and 4. Image generation model 715 is an example of, or includes aspects of, the corresponding element described with reference to FIGS. 3, 5, 6, 9, and 14.

Referring to FIG. 7, according to some aspects, targeting component 705 provides text generation prompt 720 and target token 725 to language model 710 as described with reference to FIG. 8. In some cases, language model 710 generates image generation prompt 730 based on text generation prompt 720 and target token 725 as described with reference to FIG. 8. In some cases, image generation model 715 generates synthetic image 735 based on image generation prompt 730 as described with reference to FIG. 8.

Image Generation

A method for image generation is described with reference to FIGS. 8-9. One or more aspects of the method include obtaining a text generation prompt and a target token indicating an image generation prompt attribute; generating, using a language model, an image generation prompt based on the text generation prompt and the target token, wherein the image generation prompt has the image generation prompt attribute; and generating, using an image generation model, a synthetic image based on the image generation prompt.

In some examples, obtaining the target token comprises identifying a target attribute for the synthetic image and selecting the target token based on the target attribute. In some examples, obtaining the target token comprises receiving a user input indicating the image generation prompt attribute and selecting the target token based on the user input. In some examples, generating the image generation prompt comprises appending the target token to the text generation prompt to obtain an annotated text generation prompt, where the image generation prompt is generated based on the annotated text generation prompt.

In some aspects, the image generation prompt attribute comprises an image description attribute, a vocabulary attribute, or a prompt length. In some aspects, the target token comprises a nonce token used to train the language model.

Some examples of the method further include filtering the text generation prompt based on a content filter. Some examples of the method further include filtering the image generation prompt based on a content filter.

In some aspects, the language model is trained to generate the image generation prompt having the image generation prompt attribute. In some aspects, the language model is trained based on the synthetic image.

Figure 8:
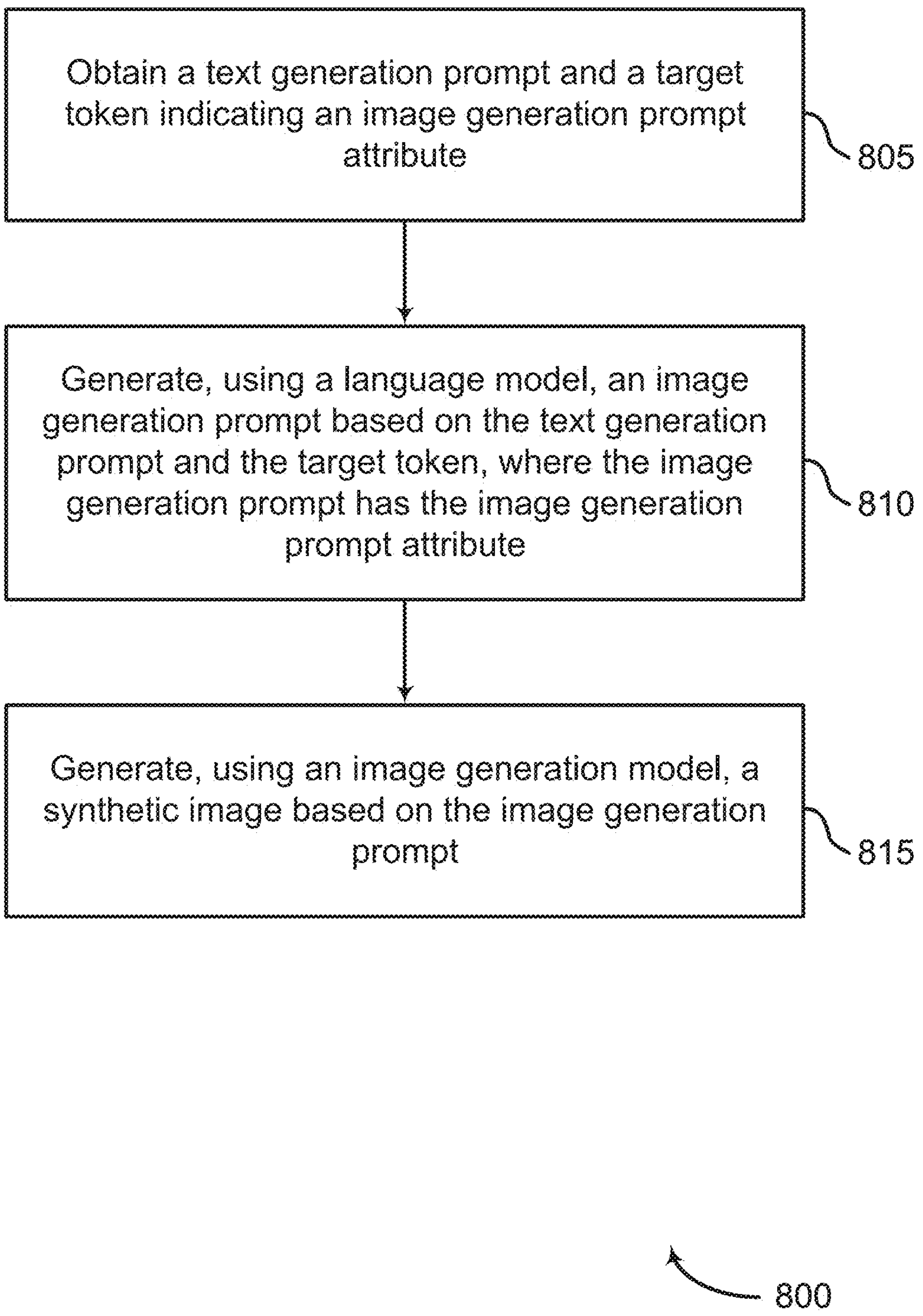
FIG. 8 shows an example of a method for generating a synthetic image according to aspects of the present disclosure.

FIG. 8 shows an example of a method 800 for generating a synthetic image according to aspects of the present disclosure. In some examples, these operations are performed by a system including a processor executing a set of codes to control functional elements of an apparatus. Additionally or alternatively, certain processes are performed using special-purpose hardware. Generally, these operations are performed according to the methods and processes described in accordance with aspects of the present disclosure. In some cases, the operations described herein are composed of various substeps, or are performed in conjunction with other operations.

Referring to FIG. 8, according to some aspects, an image generation system (such as the image generation system described with reference to FIGS. 1 and 7) generates an image generation prompt based on a text generation prompt and an image generation prompt attribute, such that the image generation prompt has the image generation prompt attribute, and generates a synthetic image based on the image generation prompt. In some cases, therefore, content of the synthetic image is modified, constrained, and/or influenced by the image generation prompt attribute, allowing the user and/or the image generation system to control content of the synthetic image in an intuitive manner.

In an example, the user provides a text generation prompt, and provides an indication to a user interface of the image generation system of an image description attribute (e.g., a high aesthetic quality). In response to the text generation prompt and the indication, the image generation system generates, using a language model, an image generation prompt having the image description attribute (e.g., a text string that the language model predicts would result in a generation of a synthetic image having a high aesthetic quality).

In a further example, the user provides a text generation prompt, and provides an indication to a user interface of the image generation system that the image generation prompt should include a prompt length (e.g., 10 words). In response to the generation text prompt and the indication, the image generation system generates an image generation prompt that has the prompt length (e.g., a text string including or consisting of 10 words).

In a further example, the user provides a text generation prompt. In response to the text generation prompt, the image generation system generates an image generation prompt having a vocabulary attribute (e.g., a text string including or consisting of one or more combinations of words that have been predetermined to be approved for use in the generation of image generation prompts).

In some cases, the image generation system then generates a synthetic image based on the image generation prompt. Accordingly, in some cases, by generating the image generation prompt based on the text generation prompt, and generating the synthetic image based on the image generation prompt, the image generation system allows a user to obtain the synthetic image without having to fully describe the synthetic image in the initial prompt, thereby increasing user access to the image generation process.

Furthermore, in some cases, by generating the image generation prompt based on an image description attribute, the image generation system allows the user to control a characteristic of the synthetic image in a more intuitive manner than by describing the characteristic using natural language. Finally, in some cases, by generating the image generation prompt having the vocabulary attribute, the image generation system is able to avoid harmful or undesirable content being depicted in the synthetic image.

At operation 805, the system obtains a text generation prompt and a target token indicating an image generation prompt attribute. In some cases, the operations of this step refer to, or may be performed by, a targeting component as described with reference to FIGS. 3 and 7.

According to some aspects, the text generation prompt includes a text string. In some cases, a user provides the text generation prompt to a user interface (such as the user interface described with reference to FIG. 3) of an image generation apparatus (such as the image generation apparatus described with reference to FIGS. 1, 3, and 15) of an image generation system (such as the image generation system described with reference to FIGS. 1 and 7). In some cases, the image generation apparatus provides the user interface on a user device (such as the user device described with reference to FIG. 1). In some cases, the user interface includes a prompt entry element configured to accept and display the text generation prompt. In some cases, the user interface provides the text generation prompt to the targeting component.

In some cases, a language verification component (such as the language verification component described with reference to FIG. 3) filters the text generation prompt based on a content filter. For example, in some cases, the language verification determines that a word (such as profanity, a proper noun, or any other undesirable word) included in the text generation prompt is not included in a list of allowed words, or is included in a list of disallowed words. In some cases, the list of allowed words and/or the list of disallowed words is stored in a database (such as the database described with reference to FIG. 1). In another example, the language verification component determines that a combination of words included in the text generation prompt is not included in a list of allowed combinations of words, or is included in a list of disallowed combinations of words. In some cases, the list of allowed combinations of words and/or the list of disallowed combinations of words is stored in the database.

In some cases, in response to the determination, the language verification component rejects the text generation prompt. In some cases, in response to the rejection, the user interface displays a message indicating that the text generation prompt is rejected. In some cases, the message indicates a reason for the rejection. In some cases, the message indicates a request to re-enter the text generation prompt. In some cases, in response to the message, the user interface receives an additional text generation prompt. In some cases, in response to the determination, the language verification component provides the text generation prompt to a language model, and the language model generates an image generation prompt such that the image generation prompt does not include inappropriate content, as described with reference to operation 810.

According to some aspects, the image generation prompt attribute comprises an image description attribute, a vocabulary attribute, or a prompt length. In some cases, an "image description attribute" refers to an intended quality of a synthetic image to be generated based on an image generation prompt including the image description attribute. An example of an image description attribute is a high aesthetic quality. In some cases, a "vocabulary attribute" refers to an intended use of a set of allowed words for generating an image generation prompt. In some cases, a "prompt length" refers to a number of words to be included in an image generation prompt. In some cases, a prompt length refers to a maximum number of words to be included in an image generation prompt.

According to some aspects, the target token (e.g., a nonce token) includes a word (e.g., a nonce word, or a word used for an occasion but not otherwise understood or recognized as a word in a given language) surrounded by brackets, where the word is an indication of the image generation prompt attribute. In an example, a high aesthetic quality image description attribute is indicated by a target token "<|aes|>". In an example, a vocabulary attribute is indicated by a target token "<|ok|>". In an example, a prompt length of 10 words, or a maximum prompt length of 10 words, is indicated by a target token "<|10|>". According to some aspects, the target token is used to train the language model (for example, as described with reference to FIGS. 10-13). In some cases, because the language model is trained using the target token, the language model is able to generate an output that includes the image generation prompt attribute indicated by the target token.

According to some aspects, the targeting component obtains the target token by identifying a target attribute for the synthetic image and selecting the target token based on the target attribute. For example, in some cases, the targeting component identifies that one or more of an image description attribute, a vocabulary attribute, and a prompt length is a target attribute, and selects a target token corresponding to the target attribute. In some cases, for example, the target attribute is an image generation prompt attribute that is predetermined by the targeting component to be included in the image generation prompt.

According to some aspects, the user interface receives a user input indicating the image generation prompt attribute. In some cases, for example, a user provides an input to an element of the user interface (e.g., a drop-down element, a slider, or other graphical or text-based element) to select or otherwise indicate the image generation prompt attribute. In some cases, the targeting component selects a target token corresponding to the indicated image generation prompt attribute.

According to some aspects, the targeting component appends the target token to the text generation prompt to obtain an annotated text generation prompt. In an example, a user provides a text generation prompt including a text character string "a bridge". In the example, the user provides an indication to the user interface that the synthetic image to be generated should have a high aesthetic quality, and that the image generation prompt to be generated should include 5 words. In the example, the targeting component obtains target tokens "<|aes|>" and "<|5|>" corresponding to the indicated image generation prompt attributes. In the example, the targeting component identifies that a vocabulary attribute is a target attribute, and obtains a target token "<|ok|>" corresponding to the identification. In the example, the target token appends the target tokens to the text generation prompt to obtain the annotated text generation prompt "<|aes|><|5|><|ok|>a bridge".

At operation 810, the system generates, using a language model, an image generation prompt based on the text generation prompt and the target token, where the image generation prompt has the image generation prompt attribute. In some cases, the operations of this step refer to, or may be performed by, a language model as described with reference to FIGS. 3, 4, and 7.

According to some aspects, the language model receives the text generation prompt and target token as input, and generates an image generation prompt based on the input. In some cases, the text generation prompt and the target token are included in the annotated text generation prompt, and the language model receives the annotated text generation prompt as input. In an example, in response to receiving an annotated text generation prompt "<|aes|><|5|><|ok|>a bridge", the language model generates an image generation prompt including a text string "bridge obscured by moody fog", such that the image generation prompt includes an image description attribute indicated by the <|aes|> target token, a prompt length indicated by the <|5|> target token, and a vocabulary attribute indicated by the <|ok|> target token. In some cases, the user interface displays the image generation prompt.

According to some aspects, the language model is trained to generate the image generation prompt having the image generation prompt attribute as described with reference to FIGS. 10-13. In some cases, the target token is used to train the language model.

In some cases, the language verification component filters the image generation prompt based on the content filter. For example, in some cases, the language verification determines that a word included in the image generation prompt is not included in the list of allowed words, or is included in the list of disallowed words. In another example, the language verification component determines that a combination of words included in the image generation prompt is not included in the list of allowed combinations of words, or is included in the list of disallowed combinations of words. In some cases, in response to the determination, the language verification component rejects the image generation prompt. In some cases, in response to the rejection, the language model regenerates the image generation prompt.

At operation 815, the system generates, using an image generation model, a synthetic image based on the image generation prompt. In some cases, the operations of this step refer to, or may be performed by, an image generation model as described with reference to FIGS. 3, 5-7, 9, and 14. For example, according to some aspects, the image generation model generates the synthetic image using an image generation process guided by the image generation prompt. In some cases, the image generation model generates the synthetic image using a diffusion process guided by the image generation prompt, as described with reference to FIGS. 5 and 9. In some cases, the user interface displays the synthetic image. In some cases, the language model is trained based on the synthetic image.

Figure 9:
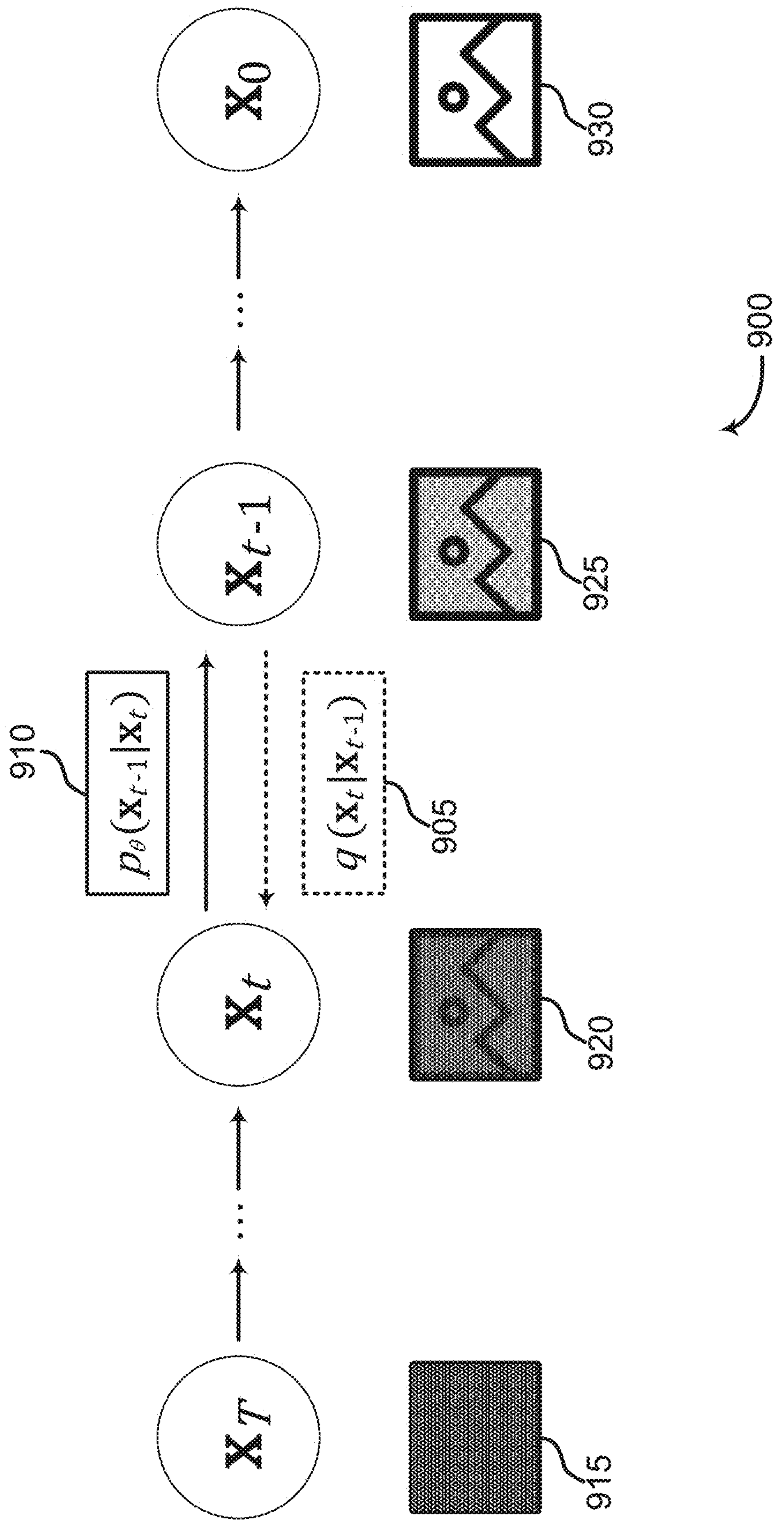
FIG. 9 shows an example of diffusion processes according to aspects of the present disclosure.

FIG. 9 shows an example 900 of diffusion processes according to aspects of the present disclosure. The example shown includes forward diffusion process 905 (such as the forward diffusion process described with reference to FIG. 5) and reverse diffusion process 910 (such as the reverse diffusion process described with reference to FIG. 5). In some cases, forward diffusion process 905 adds noise to an image or image features (e.g., original image 930 in a pixel space or image features for original image 930 in a latent space) to obtain a noise state 915 (e.g., a noisy image or a noisy image features. In some cases, reverse diffusion process 910 denoises the noise state 915 to obtain an intermediate noise state (e.g., first intermediate noise state 920 or second intermediate noise state 925) and a prediction of the original image 930.

According to some aspects, an image generation apparatus (such as the image generation apparatus described with reference to FIGS. 1, 3, and 15) uses forward diffusion process 905 to iteratively add Gaussian noise to an input at each diffusion step t according to a known variance schedule $0<\beta 1<\beta_2< \ldots \beta_T<1$:

$$q(x_t \mid x_{t-1}) = \mathcal{N}\left(x_t; \sqrt{1-\beta_t}\, x_{t-1}, \beta_t I\right) \quad (3)$$

According to some aspects, the Gaussian noise is drawn from a Gaussian distribution with mean $\mu_t=\sqrt{1-\beta_t}x_{t-1}$ and variance $\sigma^2=\beta_t\geq 1$ by sampling $\epsilon\sim\mathcal{N}(0, I)$ and setting $x_t=\sqrt{1-\beta_t}x_{t-1}+\sqrt{\beta_t}\epsilon$. Accordingly, beginning with an initial input $x_0$, forward diffusion process 905 produces $x_1, \ldots, x_t, \ldots x_T$, where $x_T$ is pure Gaussian noise.

In some cases, an observed variable $x_0$ (such as original image 930) is mapped in either a pixel space or a latent space to intermediate variables $x_1, \ldots, x_T$ using a Markov chain, where the intermediate variables $x_1, \ldots, x_T$ have a same dimensionality as the observed variable $x_0$. In some cases, the Markov chain gradually adds Gaussian noise to the observed variable $x_0$ or to the intermediate variables $x_1, \ldots, x_T$, respectively, to obtain an approximate posterior $q(x_{1:T}|x_0)$.

According to some aspects, during reverse diffusion process 910, a diffusion model (such as the image generation model described with reference to FIGS. 3, 5-7, and 14) gradually removes noise from $x_T$ to obtain a prediction of the observed variable $x_0$ (e.g., a representation of what the diffusion model predicts the original image 930 should be). In some cases, the prediction is influenced by a guidance prompt or a guidance vector (for example, an image generation prompt or an embedding of the image generation prompt as described with reference to FIG. 5). A conditional distribution $\rho(x_{x-1}|x_t)$ of the observed variable $x_0$ is unknown to the diffusion model, however, as calculating the conditional distribution would require a knowledge of a distribution of all possible images. Accordingly, the diffusion model is trained to approximate (e.g., learn) a conditional probability distribution $\rho_\theta(x_{t-1}|x_t)$ of the conditional distribution $\rho(x_{t-1}|x_t)$:

$$p_\theta(x_{t-1} \mid x_t) = \mathcal{N}\left(x_{t-1}; \mu_\theta(x_t, t), \textstyle\sum_\theta (x_t, t)\right) \quad (4)$$

In some cases, a mean of the conditional probability distribution $\rho_\theta(x_{t-1}|x_t)$ is parameterized by $\mu_\theta$ and a variance of the conditional probability distribution $\rho_\theta(x_{t-1}|x_t)$ is parameterized by $\Sigma_\theta$. In some cases, the mean and the variance are conditioned on a noise level t (e.g., an amount of noise corresponding to a diffusion step t). According to some aspects, the diffusion model is trained to learn the mean and/or the variance.

According to some aspects, the diffusion model initiates reverse diffusion process 910 with noisy data $x_T$ (such as noise state 915). According to some aspects, the diffusion model iteratively denoises the noisy data $x_T$ to obtain the conditional probability distribution po $(x_{t-1}|x_t)$. For example, in some cases, at each step t−1 of reverse diffusion process 910, the diffusion model takes $x_t$ (such as first intermediate noise state 920) and t as input, where t represents a step in a sequence of transitions associated with different noise levels, and iteratively outputs a prediction of $x_{t-1}$ (such as second intermediate noise state 925) until the noisy data $x_T$ is reverted to a prediction of the observed variable $x_0$ (e.g., a predicted image for original image 930).

According to some aspects, a joint probability of a sequence of samples in the Markov chain is determined as a product of conditionals and a marginal probability:

$$x_T: p_\theta(x_{0:T}) := p(x_T) \prod_{t=1}^{T} p_\theta(x_{t-1} \mid x_t) \quad (5)$$

In some cases, $\rho(x_T)=\mathcal{N}(x_T; 0, I)$ is a pure noise distribution, as reverse diffusion process 910 takes an outcome of forward diffusion process 905 (e.g., a sample of pure noise $x_T$) as input, and $$\prod_{t=1}^{T} p_\theta(x_{t-1} \mid x_t)$$

represents a sequence of Gaussian transitions corresponding to a sequence of addition of Gaussian noise to a sample.

Training

A method for training a machine learning model is described with reference to FIGS. 10-14. One or more aspects of the method include obtaining training data comprising a training input text and a target token indicating an image generation prompt attribute and training, using the training data, a language model to generate an image generation prompt based on the training input text and the target token.

In some examples, the training comprises generating, using an image generation model, a synthetic image based on an input prompt, classifying the synthetic image according to an image attribute, and classifying the input prompt according to the image attribute based on the classification of the synthetic image, where the training is based on the classification of the input prompt. In some examples, the training comprises computing an image attribute loss based on the classification of the input prompt and updating parameters of the language model based on the image attribute loss.

In some examples, the training comprises generating, using the language model, a predicted image generation prompt, computing a length of the predicted image generation prompt, computing a length loss based on the length, and updating parameters of the language model based on the length loss.

In some examples, the training comprises generating, using the language model, a predicted image generation prompt, determining whether the predicted image generation prompt includes inappropriate content, computing a content loss based on the determination, and updating parameters of the language model based on the content loss.

Figure 10:
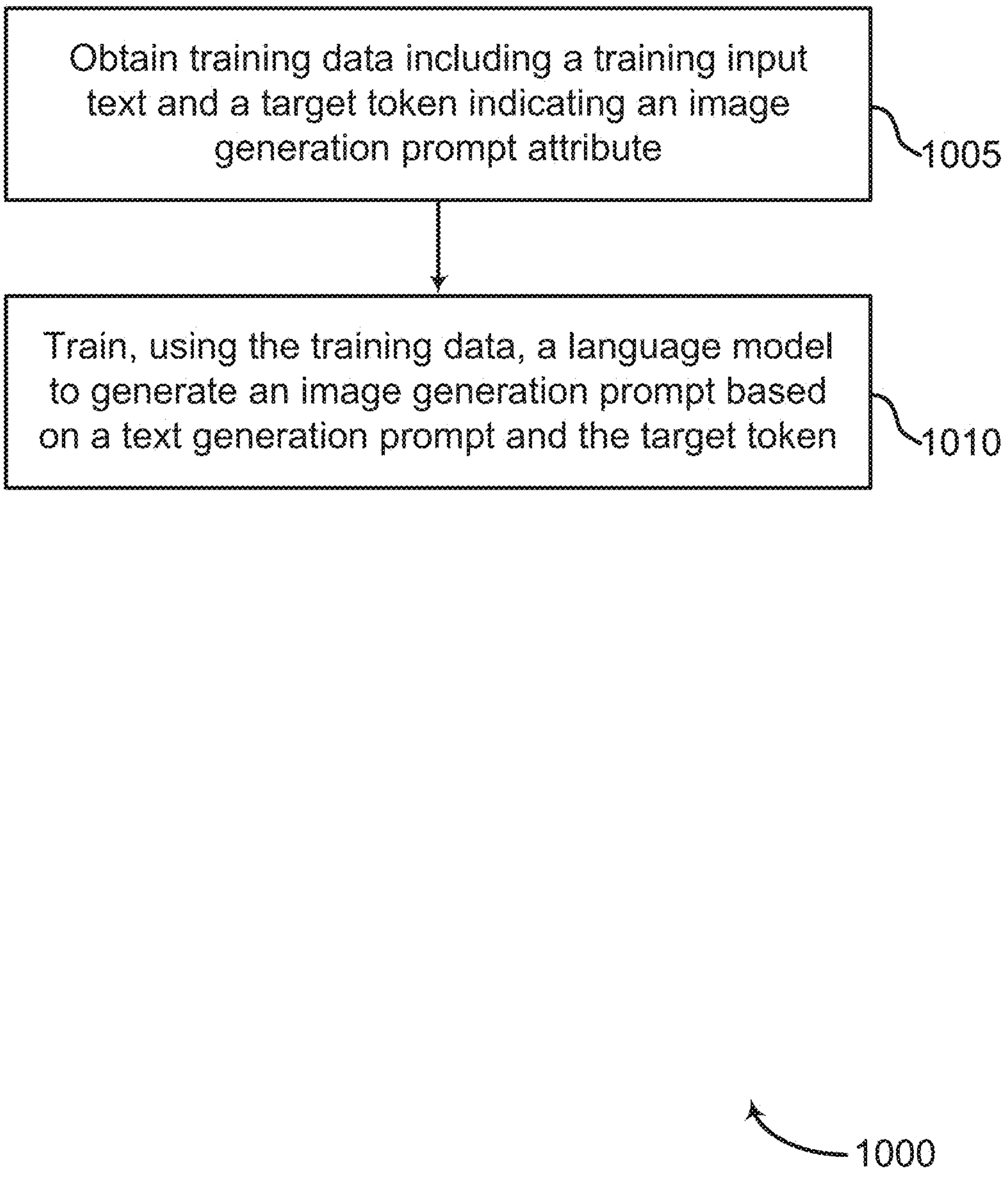
FIG. 10 shows an example of a method for training a machine learning model according to aspects of the present disclosure.

FIG. 10 shows an example of a method 1000 for training a machine learning model according to aspects of the present disclosure. In some examples, these operations are performed by a system including a processor executing a set of codes to control functional elements of an apparatus. Additionally or alternatively, certain processes are performed using special-purpose hardware. Generally, these operations are performed according to the methods and processes described in accordance with aspects of the present disclosure. In some cases, the operations described herein are composed of various substeps, or are performed in conjunction with other operations.

Referring to FIG. 10, according to some aspects, a language model (such as the language model described with reference to FIGS. 3 and 7) is trained by an image generation system (such as the image generation system described with reference to FIGS. 1 and 7) using an upside-down reinforcement learning approach to generate an image generation prompt having an image generation prompt attribute.

In upside-down reinforcement learning, a target condition is included in an input to a machine learning model, the machine learning model generates an output based on the input, and parameters of the machine learning model are updated based on a comparison between the output and the input, such that the machine learning model learns to generate an output including the target condition.

Upside-down reinforcement learning may be compared with reinforcement learning. Reinforcement learning is a type of machine learning in which an agent model learns to make decisions by taking actions within an environment and receiving feedback for the actions in the form of rewards or penalties. Through trial and error, the agent model is reinforced to perform actions that yield maximum rewards and minimum penalties, and thereby learns a policy, or a strategy for selecting actions, which maximizes an expected cumulative reward.

By contrast, in upside-down reinforcement learning, a machine learning model does not attempt to maximize a cumulative reward over time. Instead, in some cases, the target condition acts as a pseudo-reward, and instead of learning behavior by receiving rewards for generating expected outputs, the machine learning model is trained to generate an output (for example, using supervised learning) that reflects the pseudo-reward.

Supervised learning is a machine learning technique based on learning a function that maps an input to an output based on example input-output pairs. Supervised learning generates a function for predicting labeled data based on labeled training data consisting of a set of training examples. In some cases, each example is a pair consisting of an input object (e.g., a vector) and a desired output value (e.g., a single value or an output vector). In some cases, a supervised learning algorithm analyzes the training data and produces the inferred function, which can be used for mapping new examples. In some cases, the learning algorithm generalizes from the training data to unseen examples.

A loss function refers to a function that impacts how a machine learning model is trained in a supervised learning model. For example, in some cases, during each training iteration, the output of the machine learning model is compared to the known annotation information in the training data. The loss function provides a value (the “loss”) for how close the predicted annotation data is to the actual annotation data. After computing the loss, the parameters of the model are updated accordingly and a new set of predictions are made during the next iteration.

Accordingly, in some cases, by training the language model based on a target condition (e.g., an image generation prompt attribute indicated by a target token), the trained language model is able to be conditioned at inference time on the target token, such that the image generation prompt has the image generation prompt attribute. In some cases, using upside-down reinforcement learning therefore allows the image generation system to avoid using a reinforcement learning model to train the language model to generate image generation prompts having the image generation prompt attribute, thereby reducing a computational expense and increasing an efficiency of the image generation system.

At operation 1005, the system obtains training data including a training input text and a target token indicating an image generation prompt attribute. In some cases, the operations of this step refer to, or may be performed by, a training component as described with reference to FIG. 3. In some cases, the training component retrieves the training data from a database (such as the database described with reference to FIG. 1) or other data source. In some cases, a user provides the training data to the training component.

At operation 1010, the system trains, using the training data, a language model to generate an image generation prompt based on the training input text and the target token. In some cases, the operations of this step refer to, or may be performed by, a training component as described with reference to FIG. 3. For example, according to some aspects, the language model generates a predicted image generation prompt based on the training input text and the target token. In some cases, the training component appends the target token to the training input text to obtain an annotated training input text, and the language model generates the predicted image generation prompt based on the annotated training input text.

In some cases, the training component compares the predicted image generation prompt to the training input text and the target token (or to the annotated training input text). In some cases, the training component determines a loss based on the comparison and according to a loss function. In some cases, the training component updates the text generation parameters of the language model based on the loss, such that the language model learns to generate, based on a text generation prompt and the target token, an image generation prompt having the image generation prompt attribute indicated by the target token.

An example of training the language model based on an image attribute loss is described with reference to FIG. 11. An example of training the language model based on a length loss is described with reference to FIG. 12. An example of training the language model based on a content loss is described with reference to FIG. 13.

Figure 11:
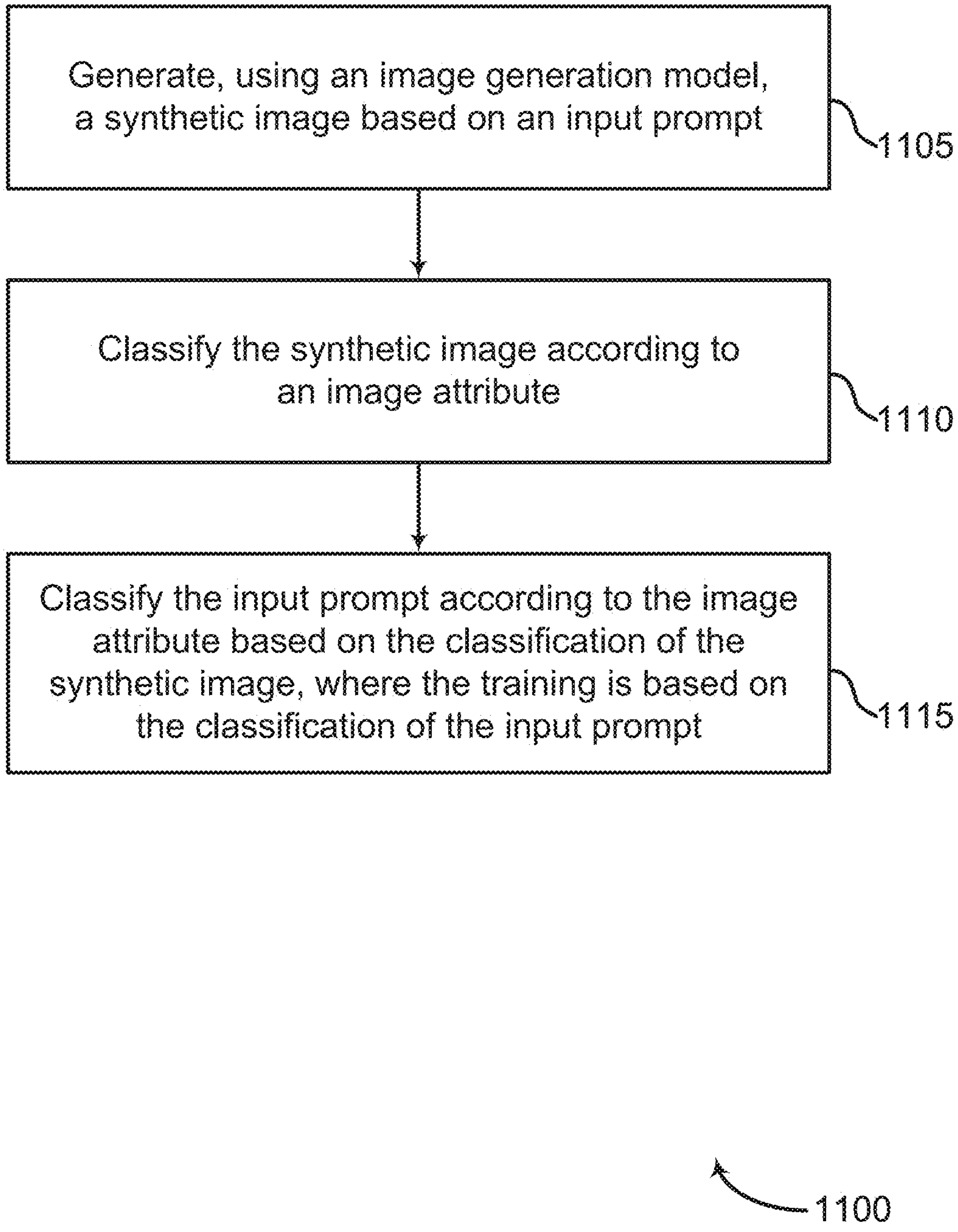
FIG. 11 shows an example of a method for training a machine learning model based on a classification of a prompt according to aspects of the present disclosure.

FIG. 11 shows an example of a method 1100 for training a machine learning model based on a classification of a prompt according to aspects of the present disclosure. In some examples, these operations are performed by a system including a processor executing a set of codes to control functional elements of an apparatus. Additionally or alternatively, certain processes are performed using special-purpose hardware. Generally, these operations are performed according to the methods and processes described in accordance with aspects of the present disclosure. In some cases, the operations described herein are composed of various substeps, or are performed in conjunction with other operations.

At operation 1105, the system generates, using an image generation model, a synthetic image based on an input prompt. In some cases, the operations of this step refer to, or may be performed by, an image generation model as described with reference to FIGS. 3, 5-7, 9, and 14. In some cases, the input prompt is a predicted image generation prompt generated as described with reference to FIG. 10, based on a training input text and a target token indicating an image description attribute (e.g., “<|aes|>”, indicating a high aesthetic quality, or “<|naes|>”, indicating a low aesthetic quality). In some cases, the training input text has the image description attribute. In some cases, the image generation model generates the synthetic image using an image generation process conditioned on the predicted image generation prompt (e.g., the diffusion process described with reference to FIGS. 5 and 9).

At operation 1110, the system classifies the synthetic image according to an image attribute. In some cases, the operations of this step refer to, or may be performed by, a classification network as described with reference to FIG. 3. In some cases, the classification component is trained to classify the synthetic image according to an image attribute corresponding to the image generation prompt attribute indicated by the target token. In an example, the classification network is trained to generate an output indicating that the synthetic image has a high aesthetic quality or a low aesthetic quality.

At operation 1115, the system classifies the input prompt according to the image attribute based on the classification of the synthetic image, where the training is based on the classification of the input prompt. In some cases, the operations of this step refer to, or may be performed by, a classification network as described with reference to FIG. 3. For example, in some cases, where the synthetic image is classified as including the image attribute, the classification network annotates the input prompt as having the image generation prompt attribute corresponding to the image attribute. In an example, where the classification network determines that the synthetic image has a high aesthetic quality, the classification network annotates the input prompt with "<|aes|>". In an example, where the classification network determines that the synthetic image has a low aesthetic quality, the classification network annotates the input prompt with "<|naes|>".

In some cases, the training component computes an image attribute loss based on the classification of the input prompt. For example, in some cases, the training component compares the annotation of the input prompt to the target token, and computes the image attribute loss based on the comparison (e.g., according to a similarity of the annotation and the target token). In some cases, the training component updates the text generation parameters of the language model based on the image attribute loss. In some cases, accordingly, the language model learns to generate an image generation prompt including an image description attribute indicated by a target token.

Figure 12:
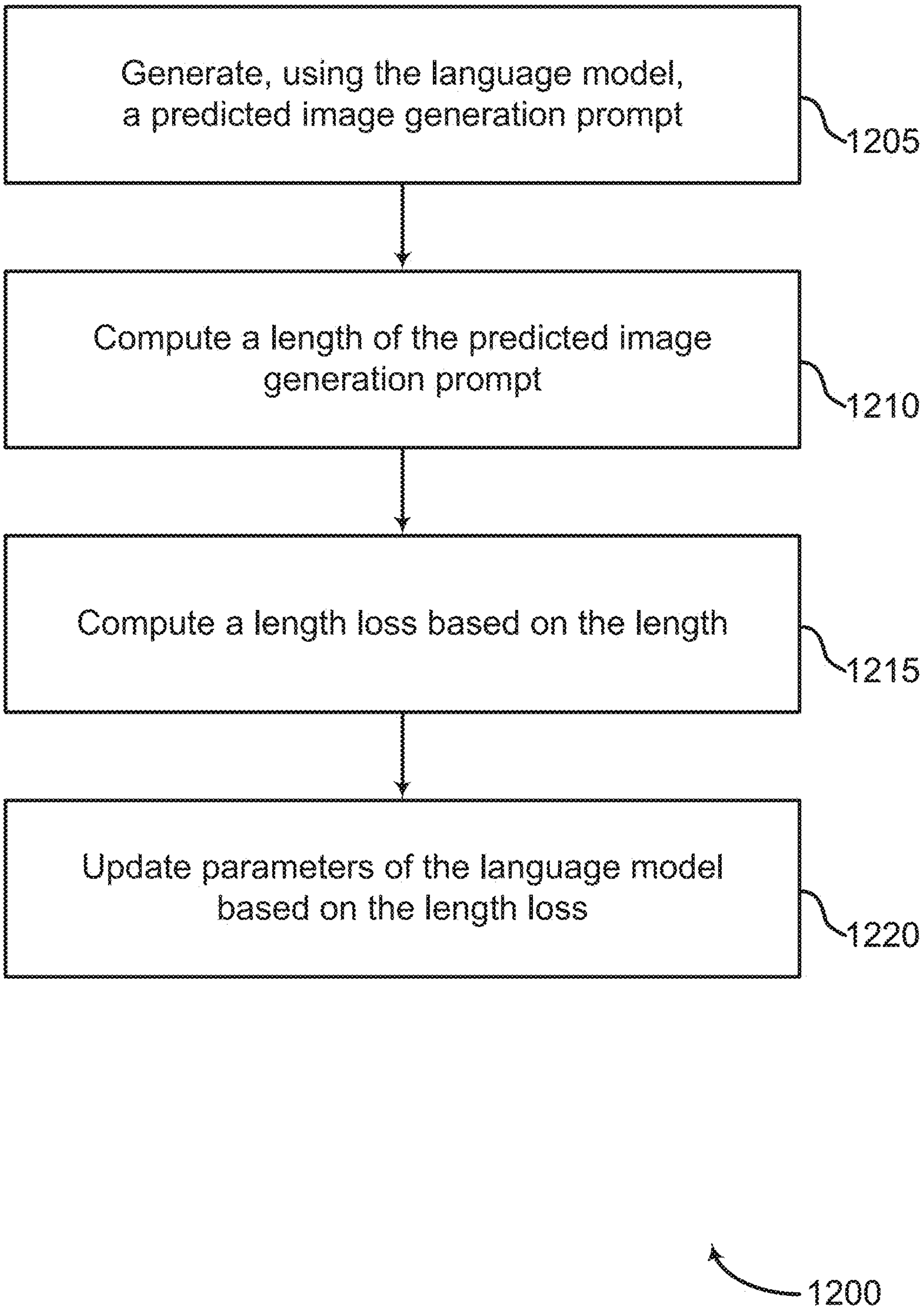
FIG. 12 shows an example of a method for training a machine learning model based on a length of a prompt according to aspects of the present disclosure.

FIG. 12 shows an example of a method 1200 for training a machine learning model based on a length of a prompt according to aspects of the present disclosure. In some examples, these operations are performed by a system including a processor executing a set of codes to control functional elements of an apparatus. Additionally or alternatively, certain processes are performed using special-purpose hardware. Generally, these operations are performed according to the methods and processes described in accordance with aspects of the present disclosure. In some cases, the operations described herein are composed of various substeps, or are performed in conjunction with other operations.

At operation 1205, the system generates, using the language model, a predicted image generation prompt. In some cases, the operations of this step refer to, or may be performed by, a language model as described with reference to FIGS. 3, 4, and 7. In some cases, the language model generates the predicted image generation prompt based on a target token indicating a prompt length as described with reference to FIG. 10. In some cases, the training input text includes a number of words indicated by the prompt length.

At operation 1210, the system computes a length of the predicted image generation prompt. In some cases, the operations of this step refer to, or may be performed by, a training component as described with reference to FIG. 3. In some cases, the training component computes the length of the predicted image generation prompt by determining a number of words included in the predicted image generation prompt. In some cases, the training component annotates the predicted image generation prompt with a number of words included in the predicted image generation prompt (e.g., "<|10|>").

At operation 1215, the system computes a length loss based on the length. In some cases, the operations of this step refer to, or may be performed by, a training component as described with reference to FIG. 3. In some cases, the training component compares the annotation of the predicted image generation prompt to the target token. In some cases, the training component computes the length loss based on the comparison (e.g., according to a similarity of the annotation and the target token).

At operation 1220, the system updates parameters of the language model based on the length loss. In some cases, the operations of this step refer to, or may be performed by, a training component as described with reference to FIG. 3. In some cases, the training component updates the text generation parameters of the language model based on the length loss. In some cases, accordingly, the language model learns to generate an image generation prompt including a prompt length indicated by a target token.

Figure 13:
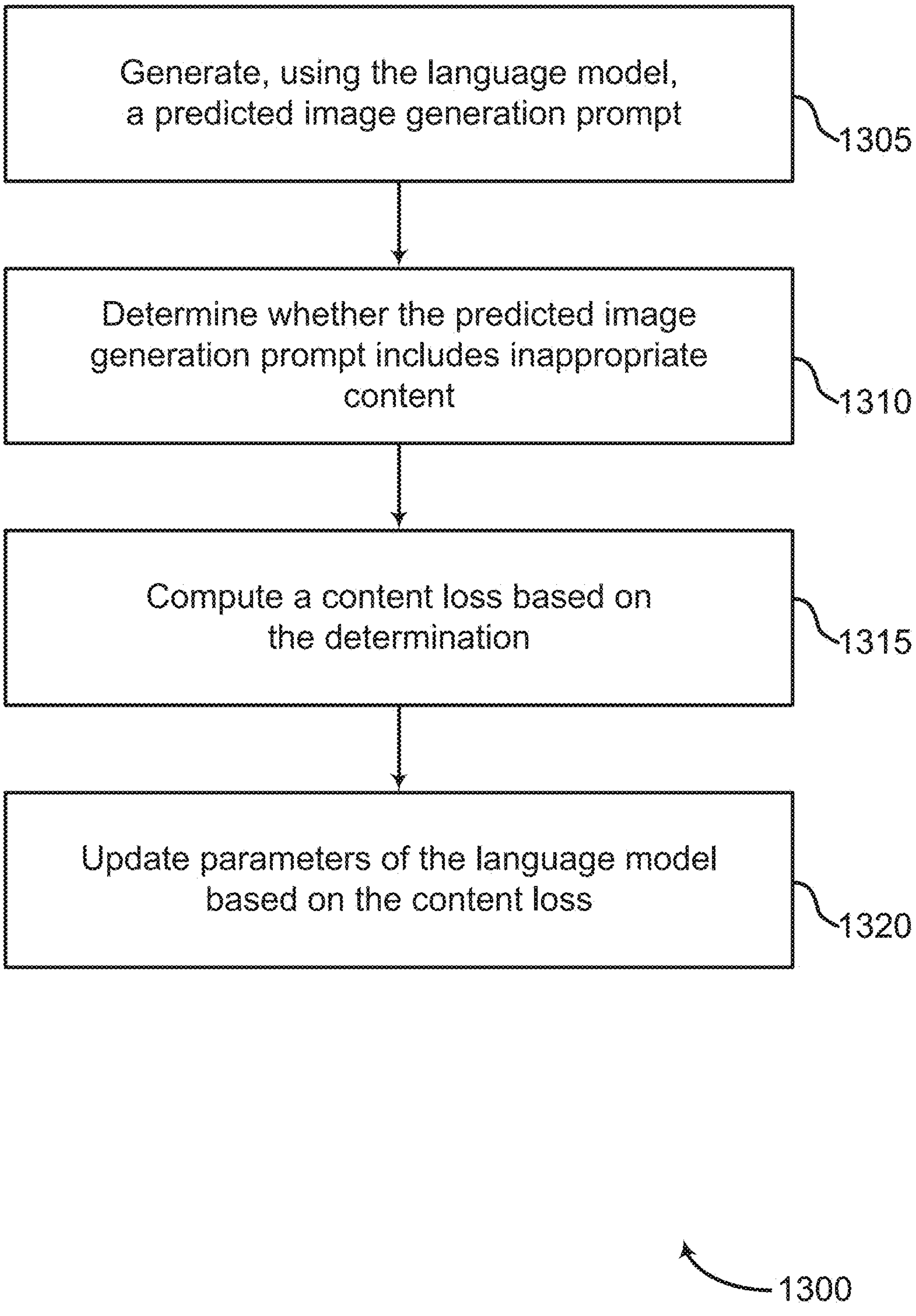
FIG. 13 shows an example of a method for training a machine learning model based on content of a prompt according to aspects of the present disclosure.

FIG. 13 shows an example of a method 1300 for training a machine learning model based on content of a prompt according to aspects of the present disclosure. In some examples, these operations are performed by a system including a processor executing a set of codes to control functional elements of an apparatus. Additionally or alternatively, certain processes are performed using special-purpose hardware. Generally, these operations are performed according to the methods and processes described in accordance with aspects of the present disclosure. In some cases, the operations described herein are composed of various substeps, or are performed in conjunction with other operations.

At operation 1305, the system generates, using the language model, a predicted image generation prompt. In some cases, the operations of this step refer to, or may be performed by, a language model as described with reference to FIGS. 3, 4, and 7. In some cases, the language model generates the predicted image generation prompt based on a target token indicating a vocabulary attribute as described with reference to FIG. 10.

In some cases, the training input text includes a word included in the list of disallowed words described with reference to FIG. 8, and the target token has a corresponding value of "<|banned|>". In some cases, the training input text does not include a word included in the list of disallowed words, or consists of one or more words included in the list of allowed words, and the target token has a corresponding value of "<|ok|>".

At operation 1310, the system determines whether the predicted image generation prompt includes inappropriate content. In some cases, the operations of this step refer to, or may be performed by, a language verification component as described with reference to FIG. 3. For example, in some cases, the language verification component determines that the predicted image generation prompt includes a word included in the list of disallowed words, and annotates the predicted image generation prompt with "<|banned|>". In some cases, the language verification component determines that the predicted image generation prompt does not include a word included in the list of disallowed words, or consists of one or more words included in the list of allowed words, and annotates the predicted image generation prompt with "<|ok|>".

At operation 1315, the system computes a content loss based on the determination. In some cases, the operations of this step refer to, or may be performed by, a training component as described with reference to FIG. 3. For example, in some cases, the training component compares the annotation of the predicted image generation prompt to the target token. In some cases, the training component computes the content loss based on the comparison (e.g., according to a similarity of the annotation and the target token).

At operation 1320, the system updates parameters of the language model based on the content loss. In some cases, the operations of this step refer to, or may be performed by, a training component as described with reference to FIG. 3. In some cases, the training component updates the text generation of the language model based on the content loss. In some cases, accordingly, the language model learns to generate an image generation prompt having a vocabulary attribute indicated by a target token. In some cases, by training the language model to understand the "<|ok|>" target token, the image generation system minimizes a trial-and-error process of generating image generation prompts, determining if the image generation prompt includes inappropriate content, and then regenerating the image generation prompt until an image generation prompt is obtained that does not include inappropriate content.

Figure 14:
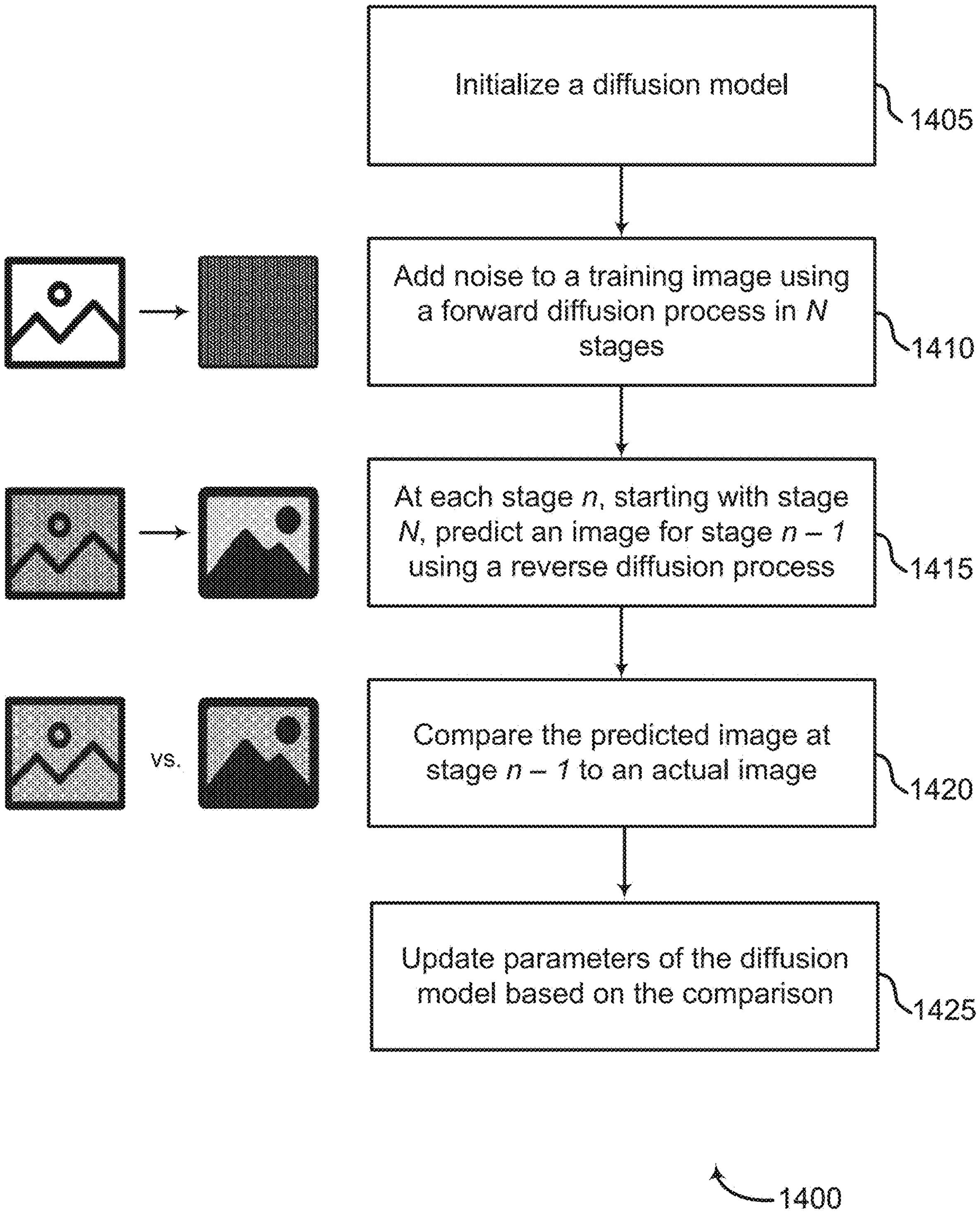
FIG. 14 shows an example of training a diffusion model according to aspects of the present disclosure.

FIG. 14 shows an example of a method 1400 for training a diffusion model according to aspects of the present disclosure. In some examples, these operations are performed by a system including a processor executing a set of codes to control functional elements of an apparatus. Additionally or alternatively, certain processes are performed using special-purpose hardware. Generally, these operations are performed according to the methods and processes described in accordance with aspects of the present disclosure. In some cases, the operations described herein are composed of various substeps, or are performed in conjunction with other operations.

Referring to FIG. 14, according to some aspects, a training component (such as the training component described with reference to FIG. 3) trains a diffusion model (such as the image generation model described with reference to FIGS. 3, 5-7, and 9) to generate a synthetic image using a diffusion process.

At operation 1405, the system initializes the diffusion model. In some cases, the operations of this step refer to, or may be performed by, a training component as described with reference to FIG. 3. In some cases, the initialization includes defining the architecture of the diffusion model and establishing initial values for parameters of the diffusion model. In some cases, the training component initializes the diffusion model to implement a U-Net architecture (such as the U-Net architecture described with reference to FIG. 6). In some cases, the initialization includes defining hyperparameters of the architecture of the diffusion model, such as a number of layers, a resolution and channels of each layer block, a location of skip connections, and the like.

At operation 1410, the system adds noise to a diffusion training image using a forward diffusion process (such as the forward diffusion process described with reference to FIGS. 5 and 9) in N stages. In some cases, the operations of this step refer to, or may be performed by, a training component as described with reference to FIG. 3. In some cases, the training component retrieves the diffusion training image from a database (such as the database described with reference to FIG. 1).

At operation 1415, at each stage n, starting with stage N, the system predicts an image for stage n−1 using a reverse diffusion process (such as a reverse diffusion process described with reference to FIGS. 5 and 9). In some cases, the operations of this step refer to, or may be performed by, the diffusion model. In some cases, each stage n corresponds to a diffusion step t. In some cases, at each stage n, the diffusion model predicts noise that can be removed from an intermediate image to obtain a predicted image. In some cases, an original image is predicted at each stage of the training process.

In some cases, the reverse diffusion process is conditioned on a training prompt. In some cases, an encoder (such as the encoder described with reference to FIG. 5) obtains the training prompt and generates the guidance features (such as the guidance embedding described with reference to FIG. 5) in a guidance space (such as the guidance space described with reference to FIG. 5). In some cases, at each stage, the diffusion model predicts noise that can be removed from an intermediate image to obtain a predicted image that aligns with the guidance features.

At operation 1420, the system compares the predicted image at stage n−1 to an actual image, such as the image at stage or the original input image (e.g., the diffusion training image). In some cases, the operations of this step refer to, or may be performed by, a training component as described with reference to FIG. 3. In some cases, the training component computes a loss function based on the comparison.

At operation 1425, the system updates image generation parameters of the diffusion model based on the comparison. In some cases, the operations of this step refer to, or may be performed by, a training component as described with reference to FIG. 3. In some cases, the training component updates the image generation parameters of the diffusion model according to on a loss determined based on the comparison.

Computing Device

Figure 15:
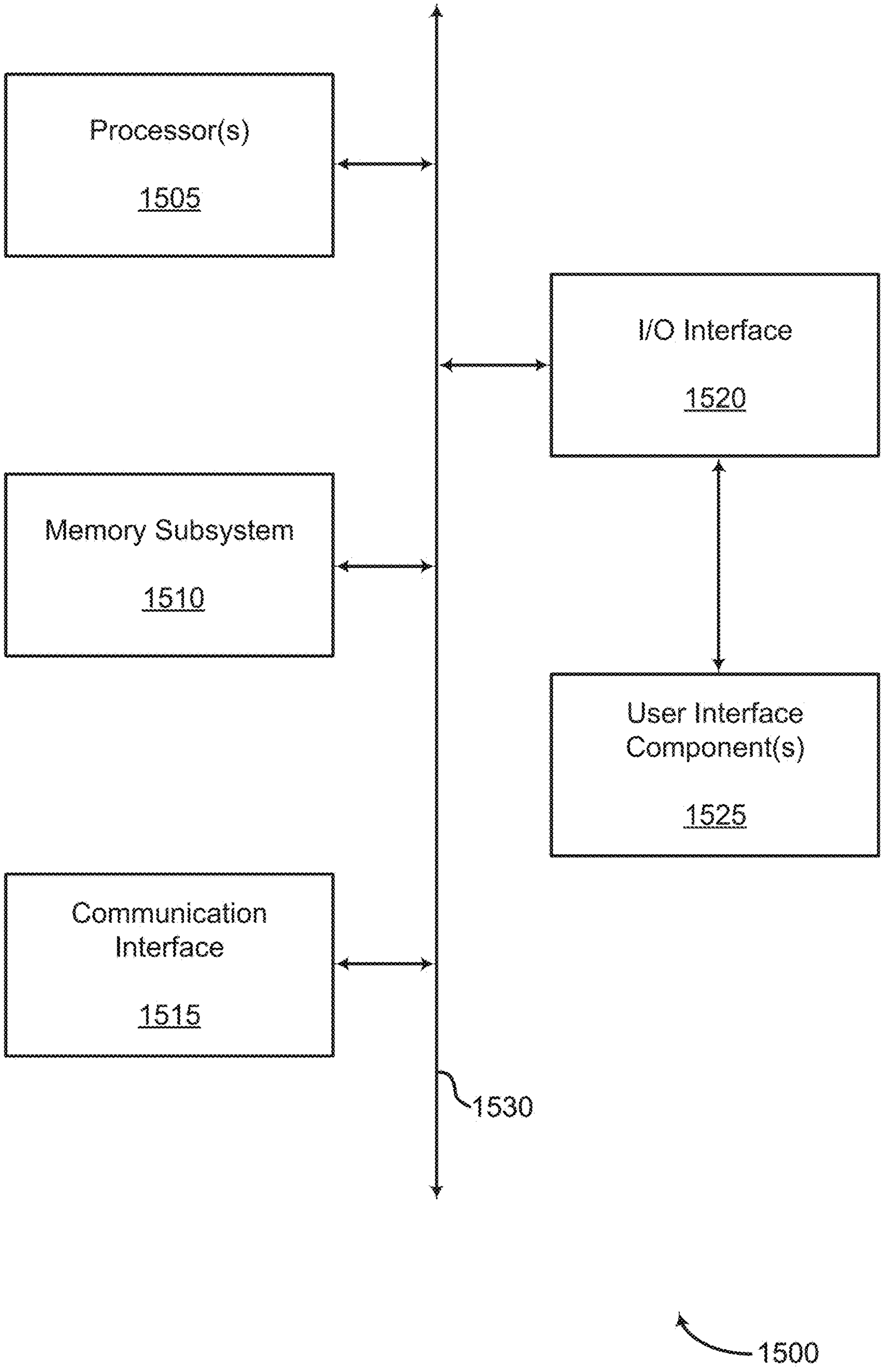
FIG. 15 shows an example of a computing device according to aspects of the present disclosure.

FIG. 15 shows an example of a computing device 1500 according to aspects of the present disclosure. According to some aspects, computing device 1500 includes processor(s) 1505, memory subsystem 1510, communication interface 1515, I/O interface 1520, user interface component(s) 1525, and channel 1530. Computing device 1500 is an example of, or includes aspects of, the image generation apparatus described with reference to FIGS. 1 and 3.

In some embodiments, computing device 1500 includes one or more processors 1505 that can execute instructions stored in memory subsystem 1510 to obtain a text generation prompt and a target token indicating an image generation prompt attribute; generate, using a language model, an image generation prompt based on the text generation prompt and the target token, wherein the image generation prompt has the image generation prompt attribute; and generate, using an image generation model, a synthetic image based on the image generation prompt.

According to some aspects, computing device 1500 includes one or more processors 1505. Processor(s) 1505 are an example of, or includes aspects of, the processor unit as described with reference to FIG. 3. In some cases, a processor is an intelligent hardware device, (e.g., a general-purpose processing component, a digital signal processor (DSP), a central processing unit (CPU), a graphics processing unit (GPU), a microcontroller, an application-specific integrated circuit (ASIC), a field programmable gate array (FPGA), a programmable logic device, a discrete gate or transistor logic component, a discrete hardware component, or a combination thereof.

In some cases, a processor is configured to operate a memory array using a memory controller. In other cases, a memory controller is integrated into a processor. In some cases, a processor is configured to execute computer-readable instructions stored in a memory to perform various functions. In some embodiments, a processor includes special-purpose components for modem processing, baseband processing, digital signal processing, or transmission processing.

According to some aspects, memory subsystem 1510 includes one or more memory devices. Memory subsystem 1510 is an example of, or includes aspects of, the memory unit as described with reference to FIG. 3. Examples of a memory device include random access memory (RAM), read-only memory (ROM), or a hard disk. Examples of memory devices include solid-state memory and a hard disk drive. In some examples, memory is used to store computer-readable, computer-executable software including instructions that, when executed, cause a processor to perform various functions described herein. In some cases, the memory contains, among other things, a basic input/output system (BIOS) which controls basic hardware or software operations such as the interaction with peripheral components or devices. In some cases, a memory controller operates memory cells. For example, the memory controller can include a row decoder, column decoder, or both. In some cases, memory cells within a memory store information in the form of a logical state.

According to some aspects, communication interface 1515 operates at a boundary between communicating entities (such as computing device 1500, one or more user devices, a cloud, and one or more databases) and channel 1530 and can record and process communications. In some cases, communication interface 1515 is provided to enable a processing system coupled to a transceiver (e.g., a transmitter and/or a receiver). In some examples, the transceiver is configured to transmit (or send) and receive signals for a communications device via an antenna.

According to some aspects, I/O interface 1520 is controlled by an I/O controller to manage input and output signals for computing device 1500. In some cases, I/O interface 1520 manages peripherals not integrated into computing device 1500. In some cases, I/O interface 1520 represents a physical connection or port to an external peripheral. In some cases, the I/O controller uses an operating system such as iOS®, ANDROID®, MS-DOS@, MS-WINDOWS®, OS/2®, UNIX®, LINUX®, or other known operating system. In some cases, the I/O controller represents or interacts with a modem, a keyboard, a mouse, a touchscreen, or a similar device. In some cases, the I/O controller is implemented as a component of a processor. In some cases, a user interacts with a device via I/O interface 1520 or via hardware components controlled by the I/O controller.

According to some aspects, user interface component(s) 1525 enable a user to interact with computing device 1500. In some cases, user interface component(s) 1525 include an audio device, such as an external speaker system, an external display device such as a display screen, an input device (e.g., a remote-control device interfaced with a user interface directly or through the I/O controller), or a combination thereof. In some cases, user interface component(s) 1525 include a GUI.

The description and drawings described herein represent example configurations and do not represent all the implementations within the scope of the claims. For example, the operations and steps may be rearranged, combined or otherwise modified. Also, structures and devices may be represented in the form of block diagrams to represent the relationship between components and avoid obscuring the described concepts. Similar components or features may have the same name but may have different reference numbers corresponding to different figures.

Some modifications to the disclosure may be readily apparent to those skilled in the art, and the principles defined herein may be applied to other variations without departing from the scope of the disclosure. Thus, the disclosure is not limited to the examples and designs described herein, but is to be accorded the broadest scope consistent with the principles and novel features disclosed herein.

The described methods may be implemented or performed by devices that include a general-purpose processor, a digital signal processor (DSP), an application specific integrated circuit (ASIC), a field programmable gate array (FPGA) or other programmable logic device, discrete gate or transistor logic, discrete hardware components, or any combination thereof. A general-purpose processor may be a microprocessor, a conventional processor, controller, microcontroller, or state machine. A processor may also be implemented as a combination of computing devices (e.g., a combination of a DSP and a microprocessor, multiple microprocessors, one or more microprocessors in conjunction with a DSP core, or any other such configuration). Thus, the functions described herein may be implemented in hardware or software and may be executed by a processor, firmware, or any combination thereof. If implemented in software executed by a processor, the functions may be stored in the form of instructions or code on a computer-readable medium.

Computer-readable media includes both non-transitory computer storage media and communication media including any medium that facilitates transfer of code or data. A non-transitory storage medium may be any available medium that can be accessed by a computer. For example, non-transitory computer-readable media can comprise random access memory (RAM), read-only memory (ROM), electrically erasable programmable read-only memory (EEPROM), compact disk (CD) or other optical disk storage, magnetic disk storage, or any other non-transitory medium for carrying or storing data or code.

Also, connecting components may be properly termed computer-readable media. For example, if code or data is transmitted from a website, server, or other remote source using a coaxial cable, fiber optic cable, twisted pair, digital subscriber line (DSL), or wireless technology such as infrared, radio, or microwave signals, then the coaxial cable, fiber optic cable, twisted pair, DSL, or wireless technology are included in the definition of medium. Combinations of media are also included within the scope of computer-readable media.

In this disclosure and the following claims, the word “or” indicates an inclusive list such that, for example, the list of X, Y, or Z means X or Y or Z or XY or XZ or YZ or XYZ. Also the phrase “based on” is not used to represent a closed set of conditions. For example, a step that is described as “based on condition A” may be based on both condition A and condition B. In other words, the phrase “based on” shall be construed to mean “based at least in part on.” Also, the words “a” or “an” indicate “at least one.”

What is claimed is:

1. A method for image generation, comprising:

obtaining a text generation prompt and a target token indicating an image generation prompt attribute;

generating, using a language model comprising an attention mechanism, an image generation prompt having the image generation prompt attribute by processing the text generation prompt and the target token using the attention mechanism, wherein the image generation prompt comprises a sequence of words indicating a target image characteristic; and generating, using an image generation model, a synthetic image based on the image generation prompt, wherein the synthetic image depicts the target image characteristic.

2. The method of claim 1, wherein obtaining the target token comprises:

identifying a target attribute for the synthetic image; and selecting the target token based on the target attribute.

3. The method of claim 1, wherein obtaining the target token comprises:

receiving a user input indicating the image generation prompt attribute; and selecting the target token based on the user input.

4. The method of claim 1, wherein:

the image generation prompt attribute comprises an image description attribute, a vocabulary attribute, or a prompt length.

5. The method of claim 1, wherein:

the target token comprises a nonce token used to train the language model.

6. The method of claim 1, further comprising:

filtering the text generation prompt based on a content filter.

7. The method of claim 1, further comprising:

filtering the image generation prompt based on a content filter.

8. The method of claim 1, wherein generating the image generation prompt further comprises:

appending the target token to the text generation prompt to obtain an annotated text generation prompt, wherein the image generation prompt is generated based on the annotated text generation prompt.

9. The method of claim 1, wherein:

the language model is trained to generate the image generation prompt having the image generation prompt attribute.

10. The method of claim 1, wherein:

the language model is trained based on the synthetic image.

11. A method for training a machine learning model, comprising:

obtaining training data comprising a training input text and a target token indicating an image generation prompt attribute; and training, using the training data, a language model comprising an attention mechanism to generate an image generation prompt using the attention mechanism based on the training input text and the target token, wherein the image generation prompt comprises a sequence of words indicating a target image characteristic.

12. The method of claim 11, wherein the training comprises:

generating, using an image generation model, a synthetic image based on an input prompt;

classifying the synthetic image according to an image attribute; and classifying the input prompt according to the image attribute based on the classification of the synthetic image, wherein the training is based on the classification of the input prompt.

13. The method of claim 12, wherein the training comprises:

computing an image attribute loss based on the classification of the input prompt; and updating parameters of the language model based on the image attribute loss.

14. The method of claim 11, wherein the training comprises:

generating, using the language model, a predicted image generation prompt;

computing a length of the predicted image generation prompt;

computing a length loss based on the length; and updating parameters of the language model based on the length loss.

15. The method of claim 11, wherein the training comprises:

generating, using the language model, a predicted image generation prompt;

determining whether the predicted image generation prompt includes inappropriate content;

computing a content loss based on the determination; and updating parameters of the language model based on the content loss.

16. A system for image generation, comprising:

at least one memory component;

at least one processor executing instructions stored in the at least one memory component;

a language model comprising an attention mechanism and text generation parameters stored in the at least one memory component, the language model trained to generate an image generation prompt having an image generation prompt attribute based on a text generation prompt and a target token indicating the image generation prompt attribute, wherein the image generation prompt comprises a sequence of words indicating a target image characteristic; and an image generation model comprising image generation parameters stored in the at least one memory component, the image generation model trained to generate a synthetic image based on the image generation prompt.

17. The system of claim 16, further comprising:

a language verification component configured to filter the text generation prompt or the image generation prompt.

18. The system of claim 16, further comprising:

a classification network configured to generate information for the target token.

19. The system of claim 16, wherein:

the language model comprises a transformer model.

20. The system of claim 16, wherein:

the image generation model comprises a diffusion model.

* * * * *